US012717826B2

(12) United States Patent
Singh

(10) Patent No.: US 12,717,826 B2
(45) Date of Patent: Aug. 25, 2026

(54) FEEDBACK TECHNIQUES FOR PROCESSING NATURAL LANGUAGE QUERIES

(71) Applicant: HONEYWELL INTERNATIONAL INC., Charlotte, NC (US)

(72) Inventor: Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 159 days.

(21) Appl. No.: 18/635,024

(22) Filed: Apr. 15, 2024

(65) Prior Publication Data

US 2025/0321999 A1 Oct. 16, 2025

(51) Int. Cl.

| | |
|---|---|
| ***G06F 7/00*** | (2006.01) |
| ***G06F 16/3329*** | (2025.01) |
| ***G06F 16/334*** | (2025.01) |
| ***G06F 16/36*** | (2019.01) |
| ***G06F 21/62*** | (2013.01) |

(52) U.S. Cl.

CPC ...... *G06F 16/3344* (2019.01); *G06F 16/3329* (2019.01); *G06F 16/374* (2019.01); *G06F 21/6227* (2013.01)

(58) Field of Classification Search

CPC ............. G06F 16/3347; G06F 16/3344; G06F 16/332; G06F 16/3322; G06F 16/35; G06F 16/24542; G06F 16/2455; G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/383; G06F 16/285; G06F 16/9535; G06F 16/3329; G06F 16/90332; G06F 16/90335; G06F 16/217; G06F 16/353; G06F 21/6227; G06F 11/3006; G06F 11/3409; G06F 11/3419

See application file for complete search history.

(56) References Cited

U.S. PATENT DOCUMENTS

| | | | | |
|---|---|---|---|---|
| 9,772,822 | B2 * | 9/2017 | Narayanan | G06F 8/20 |
| 2006/0069677 | A1 * | 3/2006 | Tanigawa | G06F 16/2228 |
| 2017/0046428 | A1 * | 2/2017 | Takase | G06F 16/3347 |
| 2017/0046622 | A1 * | 2/2017 | Gaither | G06F 40/247 |

(Continued)

*Primary Examiner* — Mohammad A Sana

(74) *Attorney, Agent, or Firm* — Alston & Bird LLP

(57) ABSTRACT

Approaches for executing feedback techniques for processing of natural language queries are described. According to one example, upon receiving a customization request in relation to a visual indicator, data fields associated with the visual indicator are displayed. Each of the data fields represents a subset of data stored within one or more datasets, the data being graphically representable through the visual indicator. A first input, including additional synonyms to be assigned to a data field from the data fields, is received. A list of pre-assigned synonyms, associated with the data field for processing of natural language queries for one or more topics, is obtained. The additional synonyms are reconciled with the list of pre-assigned synonyms to obtain an updated list of pre-assigned synonyms for the data field. The updated list of pre-assigned synonyms may be used for future processing of natural language queries raised for the one or more topics.

20 Claims, 10 Drawing Sheets

(56) References Cited

U.S. PATENT DOCUMENTS

| | | | | |
|---|---|---|---|---|
| 2021/0049158 | A1* | 2/2021 | Jiao | G06F 16/243 |
| 2023/0169074 | A1* | 6/2023 | Kim | G06F 40/247<br>704/9 |
| 2023/0315722 | A1* | 10/2023 | Saxe | G06F 16/3322<br>726/1 |

* cited by examiner

RECEIVING A CUSTOMIZATION REQUEST IN RELATION TO A VISUAL INDICATOR ALLOCATED TO A USER OF AN ORGANIZATION

502

OBTAINING ONE OR MORE DATA FIELDS ASSOCIATED WITH THE VISUAL INDICATOR

504

DISPLAYING THE ONE OR MORE DATA FIELDS

506

RECEIVING A FIRST INPUT FROM THE USER, THE FIRST INPUT INCLUDING ONE OR MORE ADDITIONAL SYNONYMS TO BE ASSIGNED TO AT LEAST ONE DATA FIELD FROM THE ONE OR MORE DATA FIELDS

508

OBTAINING A LIST OF PRE-ASSIGNED SYNONYMS ASSOCIATED WITH THE AT LEAST ONE DATA FIELD

510

RECONCILING THE ONE OR MORE ADDITIONAL SYNONYMS WITH THE LIST OF PRE-ASSIGNED SYNONYMS TO OBTAIN AN UPDATED LIST OF PRE-ASSIGNED SYNONYMS FOR THE AT LEAST ONE DATA FIELD

512

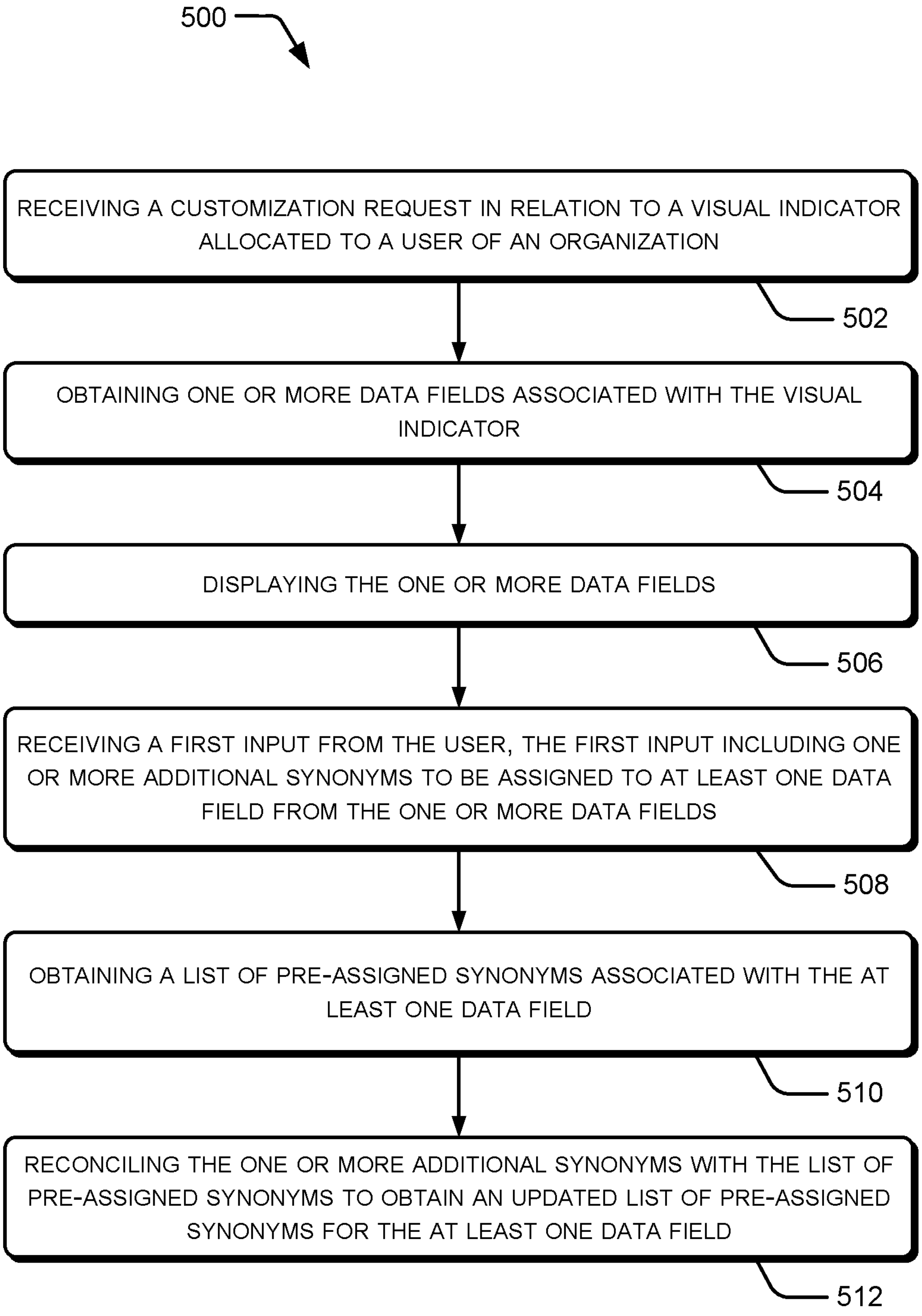

FIG. 5

FEEDBACK TECHNIQUES FOR PROCESSING NATURAL LANGUAGE QUERIES

BACKGROUND

Business intelligence (BI) tools that support parsing of natural language queries are widely used in organizations. Such BI tools may be used by users, such as employees of an organization, to seek details for various business-related aspects related to the organization. For instance, such BI tools may be used by users to obtain financial details or performance details about an organization. To obtain the details, the user may raise natural language queries in the BI tools. For instance, the user may raise queries in the BI tools to seek details about sales, marketing, retail, market trends, new products, preference of consumers, etc., in relation to an organization. Such BI tools may render answers to the natural language queries in textual or visual forms, such as in form of charts and graphs.

BRIEF DESCRIPTION OF FIGURES

Systems and/or methods are now described, in accordance with examples of the present subject matter and with reference to the accompanying figures, in which:

FIG. 5 illustrate a method for implementation of feedback techniques for processing of natural language queries, according to an example;

DETAILED DESCRIPTION

Figure 1:
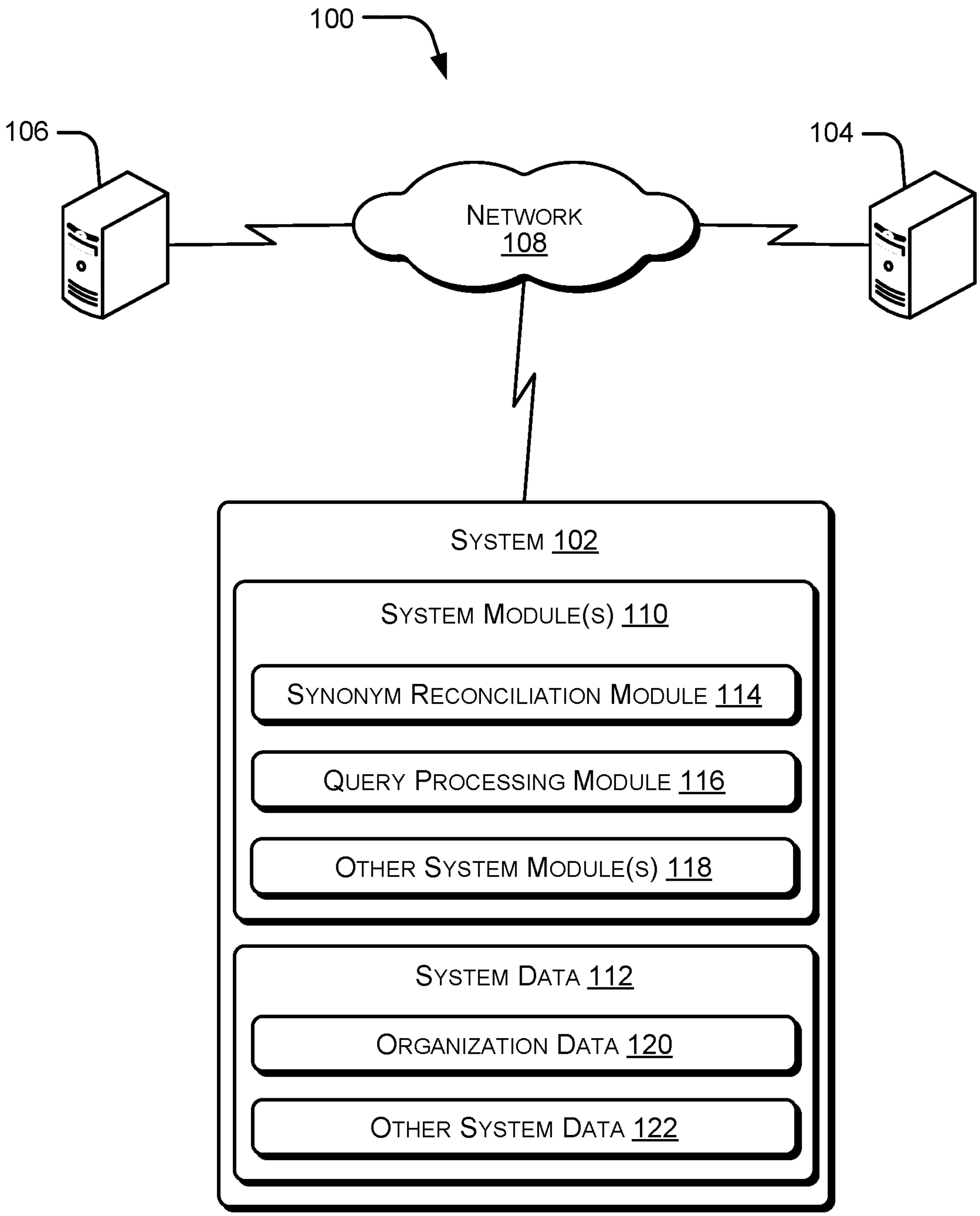
FIG. 1 illustrates a communication environment implementing a system for executing feedback techniques for processing of natural language queries, according to an example.

Typically, a BI tool may be pre-configured to process natural language queries raised by a user. The BI tool may be pre-configured by a BI tool author. The BI tool author may be a user having authorization to pre-configure the BI tool to enable processing of natural language queries. During the pre-configuration, the BI tool author may create a topic that may represent a subject area such as sales, media, or marketing about which questions can be asked by a user of an organization. The BI author may associate the topic with a dataset including data in relation to the subject area and the organization. The dataset may include data fields, where each data field represents a subset of the data within the dataset. In an example, the data field may be a column name within the dataset. For instance, for a topic "product sales analysis", examples of the data fields may include "sales person", "product name", "date of sale", etc.

During the pre-configuration, the BI tool author typically assigns synonyms to each data field for enabling processing of natural language queries. For example, the BI tool author may assign synonyms "salesman", "saleswoman", "agent", "sales representative", etc., to the data field "sales person". Thus, even if the synonyms are used in a natural language query instead of the actual data field, the BI tool may be able to process the natural language query and provide a response for the natural language query. The BI tool may provide the response in the form of a visual indicator that graphically represents the data within the dataset. The visual indicator may also be pre-configured by the BI tool author for responding to natural language queries. Examples of the visual indicator may include, but are not limited to, a chart, a graph, a dashboard, etc. In one example, the dashboard may further include one or more charts or graphs.

However, the natural language query is generally raised by a BI tool reader. The BI tool reader is typically different from the BI tool author. The BI tool reader may not be aware of the synonyms pre-configured in the BI tool and thus may not be able to efficiently use natural language queries. Further, since the BI tool reader generally does not have authorization to pre-configure the BI tool, the BI tool reader may not be able to specify useful synonyms for the data fields.

For example, the BI tool author may not be well versed with industry or enterprise specific terminologies used by the BI tool reader to refer to a particular data field. For instance, within a department of the BI tool reader, the sales person may be referred with terms such as a "rep" or a "dealer" and the BI tool author may not be aware about such terms. Since there is no coordination between the BI tool author and the BI tool reader, a list of the synonyms for the data fields assigned by the BI tool author may be devoid of the industry or enterprise specific terminologies generally used by the BI tool reader. Thus, in absence of the industry or enterprise specific terminologies in the list of synonyms, the BI tool may not be able to provide a response to the natural language query raised by the BI tool reader, or the BI tool may provide an inaccurate response to the natural language query.

In an example, the BI tool author may reach out to BI tool readers to seek inputs regarding synonyms for the data fields. In another example, the BI tool reader may provide feedback to the BI tool author upon receiving the inaccurate response or not receiving any response to the natural language query. However, either way, the BI tool author will have to manually go through the inputs or the feedback to decide which terms from the terminologies suggested by the BI tool reader should be added to the list of the synonyms for the data fields. Reaching out to the BI tool readers and manually going through the inputs or the feedback is a time consuming and a tedious task. Further, there are high chances of errors while updating the list of synonyms for the data fields based on such unstructured inputs and feedback. For example, the BI tool author may miss out some of the terms or may enter wrong terms as synonyms of the data fields. This may lead to wastage of manual and processing resources that are consumed for updating the list of synonyms which may eventually be devoid of some industry specific terminologies or may include incorrect synonyms. This problem escalates as the number of datasets associated with the organization increases.

Approaches for executing feedback techniques for processing of natural language queries are described. In one example implementation, the present subject matter facilitates in automated and secure optimization of synonyms of one or more data fields associated with a visual indicator to enable accurate processing of future natural language queries. The synonyms are optimized based on feedback received from a user of an organization. Initially, visual indicators that are allocated to the user may be presented to the user for enabling the user to provide the feedback. In one example, a customization request may be received in relation to a visual indicator allocated to the user. Subsequently, one or more data fields associated with the visual indicator may be displayed on a user interface. Each of the one or more data fields may represent a subset, from one or more subsets, of data stored within one or more datasets associated with the user. In one example, the data may be graphically representable through the visual indicator.

Subsequently, a first input may be received from the user. The first input may include one or more additional synonyms to be assigned to at least one data field from the one or more data fields. A list of pre-assigned synonyms, associated with the at least one data field for processing of natural language queries, may then be obtained. In one example, the natural language queries may be raised by the user in relation to one or more topics for which the user is authorized to raise natural language queries. In one example, the natural language query is to be processed using at least in part the at least one data field. The one or more additional synonyms are then reconciled with the list of pre-assigned synonyms to obtain an updated list of pre-assigned synonyms for the at least one data field. The updated list of pre-assigned synonyms may be used for future processing of natural language queries raised for the one or more topics. Thus, a simple and robust methodology is provided for optimization of synonyms of the one or more data fields.

In an example implementation of the present subject matter, to enable a user to suggest and assign synonyms to a data field, initially, the visual indicator and a customization tag associated with the visual indicator may be rendered on the user interface in response to a user request received from the user. Further, it may be ascertained if a user selection of the customization tag has been detected. In an example, the detection of the user selection may be considered as receiving the customization request.

Once the customization request has been received, the one or more data fields, to be displayed to the user, may be obtained. To obtain the one or more data fields, a first set of data fields in relation to the visual indicator may be initially identified. The first set of data fields may include all data fields that are particularly representable through the visual indicator for which the customization tag is selected by the user. Additionally, one or more datasets may be identified from amongst a plurality of datasets associated with the organization. The one or more datasets may be datasets in relation to which the user is assigned a dataset access permission. Subsequently, a second set of data fields associated with the one or more datasets may be identified from amongst the first set of data fields. Thus, the second set of data fields may be a subset of the first set of data fields that are associated with datasets which are allowed to be accessed by the user considering the dataset access permission. Subsequently, one or more topics may be identified from amongst a plurality of topics associated with the organization. The one or more topics may be topics in relation to which the user is authorized to raise a natural language query. The one or more data fields associated with the one or more topics may then be identified from amongst the second set of data fields. Thus, the one or more data fields may be a subset of the second set of data fields that are associated with the topics about which the user is allowed to raise the natural language query. The one or more data fields that are identified may then be displayed to the user, enabling the user to suggest synonyms for the one or more data fields.

The user may then provide a first input including one or more additional synonyms to be assigned to at least one data field from the one or more data fields that are displayed to the user. In an example, upon receiving the first input, the one or more additional synonyms for the at least one data field may be stored in a first database. The first database may be managed by a first entity. For example, the first entity may be a first organization that manages a feedback application that can be accessed by the user to provide feedback with regard to the synonyms for the data fields.

In one example implementation, for utilizing the feedback provided by the user, a reconciliation request may be received from another user. In an example, in response to a reconciliation request, the one or more additional synonyms for the at least one data field may be retrieved from the first database. Further, a list of pre-assigned synonyms associated with the at least one data field may be retrieved from a second database for reconciliation with the one or more additional synonyms to obtain an updated list of pre-assigned synonyms. The updated list of pre-assigned synonyms may be used for future processing of natural language queries raised for the one or more topics. The second database may be managed by a second entity. The second entity may be different from the first entity. For example, the second entity may be a second organization that manages a BI tool application that can be accessed by the other user to optimize synonyms for the data fields.

In an example, for reconciling the list of pre-assigned synonyms with the one or more additional synonyms, at least one dataset may be identified from amongst the one or more datasets. For the sake of brevity, "at least one dataset" has been referred to as "dataset" hereinafter. The dataset may be a dataset in relation to which the other user is assigned a dataset access permission. Additionally, at least one topic may be identified from amongst the one or more topics. For the sake of brevity, "at least one topic" has been referred to as "topic" hereinafter. The topic may be a topic in relation to which the other user is assigned a topic modification permission. A specific data field associated with the dataset and the topic may further be identified from amongst the at least one data field. Thus, the specific data field may be a subset of the at least one data field for which feedback is provided by the user. The specific data field may be associated with datasets which are allowed to be accessed by the other user and associated with topics which are allowed to be modified by the other user. For the specific data field, the one or more additional synonyms may be compared with the list of pre-assigned synonyms to determine at least one distinct synonym for the specific data field. Subsequently, the at least one distinct synonym may be incorporated in the list of pre-assigned synonyms to obtain the updated list of pre-assigned synonyms for the at least one data field. Thus, in view of the reconciliation request, feedback for only certain specific data fields is used considering the permissions of the other user.

The updated list of pre-assigned synonyms may be stored in the second database. The second database may be accessed for the future processing of the natural language queries. The BI tool application may be accessed by the user, from which the feedback is received, to raise a natural language query and seek details for various business-related aspects related to the organization. The BI tool application may access the second database to process the natural language query using the updated list of pre-assigned synonyms and provide a response to the natural language query.

The described approaches thus enable a structured coordination between a user that optimizes the synonyms for the data fields and a user that raises natural language queries. The described approaches provide a simple and a robust methodology to quickly and automatically incorporate, without manual efforts, industry or enterprise specific terminologies in the list of synonyms that is used to process the natural language queries. Further, the described approaches eliminate errors that may otherwise occur during manual analysis of feedback and inputs regarding synonyms and manual updating of the list of synonyms. As a result, the accuracy of the response generated for the natural language query by the BI tool application may be improved. The described approaches significantly reduce the time and the processing resources consumed for updating the list of synonyms. Further, since the user is not required to manually update synonyms for each and every data field, the described approaches significantly reduce the power consumed by an electronic device for updating the list of synonyms, thereby increasing the battery life of the electronic device.

According to the described approaches, the one or more data fields that are displayed on the user interface are data fields associated with the visual indicator, the one or more datasets, and the one or more topics for each of which the user has an access or modification permission. Thus, the user is able to provide feedback regarding synonyms only for specific data fields considering the access or modification permissions of the user. As a result, the synonyms of the data fields may be optimized in a secure manner eliminating the risk of synonym feedback by unauthorized users.

Further, according to the described approaches, in response to the reconciliation request, the specific data field is identified. The specific data field is a data field associated with the dataset and the topic for which the other user has an access or modification permission. Thus, the other user is able to update the synonyms only for the specific data field considering the access or modification permissions of the other user. As a result, the synonyms of the data fields may be optimized in a secure manner eliminating the risk of synonym modification by unauthorized users.

The present subject matter is further described with reference to FIG. 1 to FIG. 7. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a communication environment 100 implementing a system 102 for executing feedback techniques for processing of natural language queries, according to an example. The natural language queries may be raised by a user of an organization to ask questions about one or more topics. Each of the one or more topics may represent a subject area, such as sales, media, marketing, etc., about which the questions can be asked by the user. Further, each of the one or more topics may be associated with one or more datasets including data in relation to the subject area. A subset of data within the dataset may be represented by one or more data fields. A response to a natural language query may be provided in the form of a visual indicator. The visual indicator, in one example, may provide graphical representations of the data. Examples of the visual indicator may include, but are not limited to, a chart, a graph, a dashboard, etc. In one example, the dashboard may further include one or more charts or graphs.

Examples of the system 102 may include, but are not limited to, a laptop, a desktop, a tablet computer, and a smart phone. In an example, the system 102 may be operated by a user for configuring and customizing one or more topics about which natural language queries may be raised. In another example, the system 102 may be operated by a user for raising a natural language query and viewing a response to the natural language query. In another example, the system 102 may be operated by a user for providing feedback for the processing of natural language queries.

The communication environment 100 may further include a business intelligence (BI) tool server 104 and a feedback application server 106. The BI tool server 104 may be configured to host a BI tool. In an example, a version of the BI tool may be installed on the system 102 as a software application. In another example, a version of the BI tool may be accessed on the system 102 as a website. In an example, the BI tool may be accessed by a user, through the system 102, to configure and customize various topics. Data associated with the customized topics may be stored in the BI tool server 104 for future processing of natural language queries. In another example, the BI tool may be accessed by a user, through the system 102, to raise a natural language query in relation to any of the various topics and generate a response for the natural language queries. In an example, the BI tool server 104 may store and maintain data associated with the BI tool, and give authorized users access to the data. In one example, the BI tool server 104 may be hosted virtually, for example, on a cloud-based platform at a site or away from the site. In another example, the BI tool server 104 may be a stand-alone physical system geographically located either on the site or away from the site. Examples of the site may include, but are not limited to, a building of a company, or any other working environments in any industry or enterprise.

The feedback application server 106 may be configured to host a feedback application. In an example, a version of the feedback application may be installed on the system 102 as a software application. In another example, a version of the feedback application may be accessed on the system 102 as a website. The feedback application may be accessed by a user, through the system 102, to provide feedback for processing of the natural language queries by the BI tool. In an example, the feedback application server 106 may store and maintain data associated with the feedback, and give authorized users access to the data. In one example, the feedback application server 106 may be hosted virtually, for example, on a cloud-based platform at a site or away from the site. In another example, the feedback application server 106 may be a stand-alone physical system geographically located either on the site or away from the site. Examples of the site may include, but are not limited to, a building of a company, or any other working environments in any industry or enterprise.

In an example, the BI tool server 104 and the feedback application server 106 may be managed and owned by different entities; and may be located at different geographical locations. In another example, the BI tool server 104 and the feedback application server 106 may be managed and owned by same entities; and may be co-located at a same geographical location.

The system 102, the BI tool server 104, and the feedback application server 106 may be communicably coupled with each other over a network 108 and may exchange data and signals over the network 108. The network 108 may be a wireless network, a wired network, or a combination thereof. The network 108 may also be an individual network or a collection of many such individual networks, interconnected with each other and functioning as a single large network, e.g., the Internet or an intranet. Examples of such individual networks include, but are not limited to, local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 108 may include various network entities, such as transceivers, gateways, and routers. In an example, the network 108 may include any communication network that uses any of the commonly used protocols, for example, Hypertext Transfer Protocol (HTTP), and Transmission Control Protocol/Internet Protocol (TCP/IP).

The system 102 may include system module(s) 110 and system data 112. The system 102 may also include components, other than the depicted components, such as display, input/output interfaces, operating systems, applications, and other software or hardware components (not shown in the figures).

The system module(s) 110 may be implemented as a combination of hardware and programming, for example, programmable instructions to implement a variety of functionalities of the system module(s) 110. In examples described herein, such combinations of hardware and programming may be implemented in several different ways. For example, the programming for the system module(s) 110 may be executable instructions. Such instructions may be stored on a non-transitory machine-readable storage medium which may be coupled either directly with the system 102 or indirectly (for example, through networked means). In an example, the system module(s) 110 may include a processing resource, for example, either a single processor or a combination of multiple processors, to execute such instructions. In the present examples, the non-transitory machine-readable storage medium may store instructions that, when executed by the processing resource, implement the system module(s) 110. In other examples, the system module(s) 110 may be implemented as electronic circuitry.

In one example, the system module(s) 110 may include a synonym reconciliation module 114, a query processing module 116, and other system module(s) 118. The other system module(s) 118 may further implement functionalities that supplement functions performed by the system 102 or any of the system module(s) 110.

The system data 112 includes data that is either received, stored, or generated as a result of functions implemented by any of the system module(s) 110 or the system 102. It may be further noted that information stored and available in the system data 112 may be utilized by the system module(s) 110 for performing various functions by the system 102. In an example, the system data 112 may include organization data 120 and other system data 122. The other system data 122 may include data generated by the system module(s) 110. It may be noted that such examples are only indicative. The present approaches may be applicable to other examples without deviating from the scope of the present subject matter. The organization data 120 may be defined as data, such as sales data and products data, associated with the organization. In an example, the organization data 120 may be stored in the form of one of more datasets which may be utilized for responding to natural language queries raised by users of the organization. In an example, a visual indicator, graphically representing a desired portion of the organization data 120, may be presented to a user as a response to a natural language query raised by the user.

In operation, the synonym reconciliation module 114 of the system 102 may render a visual indicator and a customization tag associated with the visual indicator on a user interface. In an example, the customization tag may be an icon that may be displayed on a display of the system 102. The customization tag may be selected by a user to initiate a customization request in relation to the visual indicator. In an example, the visual indicator may be configured as a selectable icon to act as the customization tag. In an example, the customization tag may be a dedicated icon separate from the visual indicator. In an example, the visual indicator and the customization tag may be rendered in response to a user request received from a user of an organization. The organization may be a particular organization in relation to which the user may ask natural language queries.

In response to detecting a user selection of the customization tag, the synonym reconciliation module 114 of the system 102 may display one or more data fields associated with the visual indicator. For the sake of brevity, "one or more data fields" has been referred to as "data fields" hereinafter. The data fields may be displayed on the user interface. The data fields may, for example, be a parameter represented on an x-axis field of the visual indicator, a parameter represented on a y-axis field of the visual indicator, etc. Each of the data fields may represent a subset, from one or more subsets, of data stored within a dataset associated with the user. For instance, for a dataset corresponding to "product sales analysis" for the organization, the data fields may be column names, for example, "sales person", "product name", "date of sale", etc., within the dataset. The dataset may be a part of the organization data 120. Further, the dataset may be pre-stored in the system 102. The data stored within the dataset may be graphically representable through the visual indicator.

In an example, the synonym reconciliation module 114 may receive a first input from the user. The first input may comprise one or more additional synonyms to be assigned to at least one data field from the data fields displayed on the user interface. The one or more additional synonyms may, for example, be industry or enterprise specific terminologies generally used to refer to the at least one data field.

The synonym reconciliation module 114 may further obtain a list of pre-assigned synonyms associated with the at least one data field for processing of natural language queries in relation to one or more topics. In an example, the list of pre-assigned synonyms may be obtained from the BI tool server 104. The list of pre-assigned synonyms may be pre-stored in the BI tool server 104. In an example, the user may be authorized to raise a natural language query in relation to the one or more topics, where the natural language query is to be processed using at least in part the at least one data field.

The synonym reconciliation module 114 may then reconcile the one or more additional synonyms with the list of pre-assigned synonyms to obtain an updated list of pre-assigned synonyms for the at least one data field. In this way, using feedback of the user about synonyms of the data fields, industry or enterprise specific terminologies may be incorporated in the list of synonyms that is used to process the natural language queries.

In an example, the query processing module 116 of the system 102 may process a natural language query for the one or more topics using the updated list of pre-assigned synonyms. In this way, the feedback from the user about synonyms of the data fields may be utilized to refine processing of the natural language query and improve the accuracy of a response generated for the natural language query.

Figure 2:
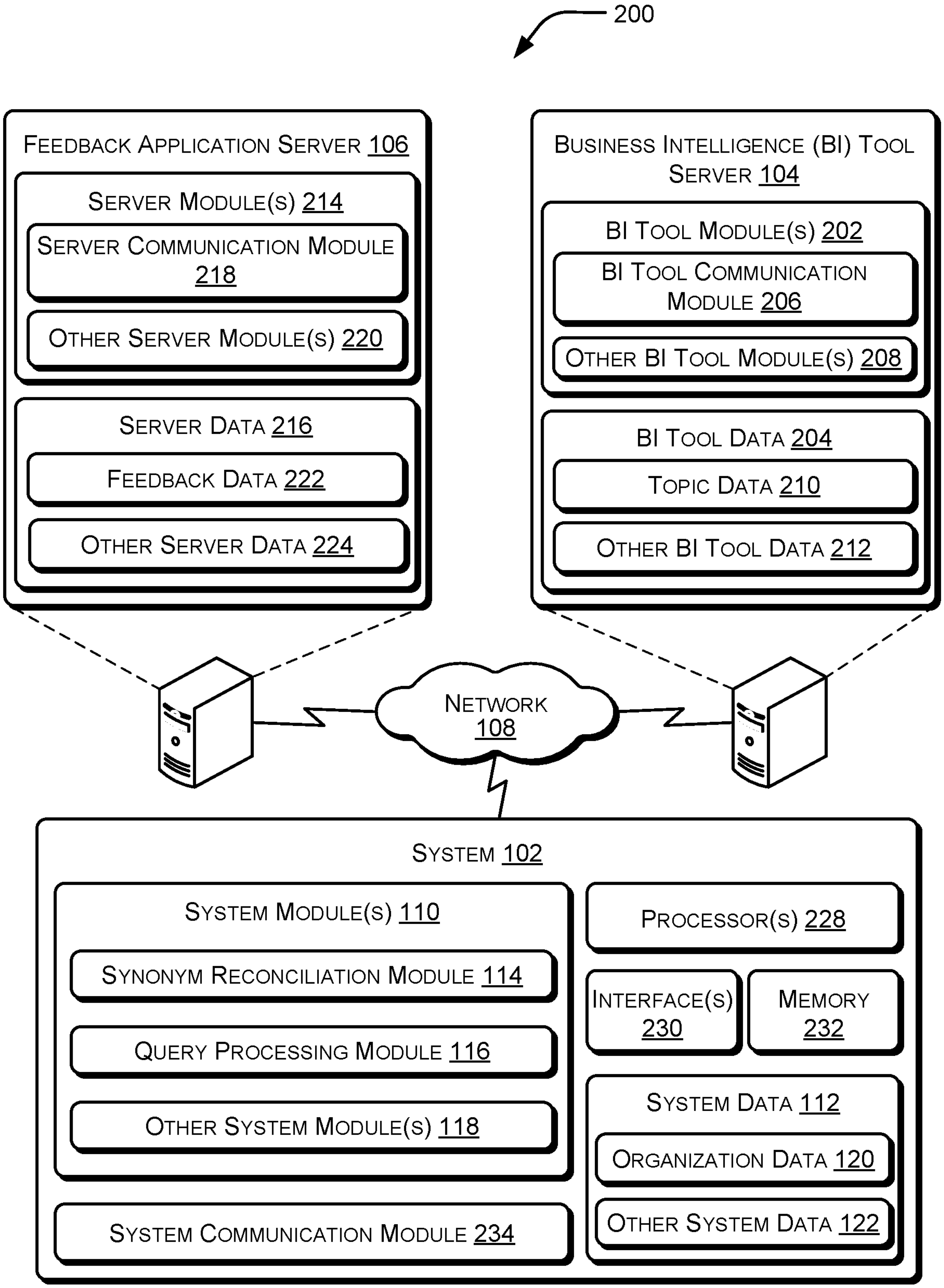
FIG. 2 illustrates a communication environment implementing the system for executing feedback techniques for processing of natural language queries, according to another example.

FIG. 2 illustrates a communication environment 200 implementing the system 102, according to another example. In one example, the communication environment 200 may include the system 102, the BI tool server 104, and the feedback application server 106. The system 102, the BI tool server 104, and the feedback application server 106 may be communicably coupled with each other over the network 108.

In one example, the BI tool server 104 may include BI tool module(s) 202 and BI tool data 204. The BI tool server 104 may include components, other than the depicted components, such as display, processor(s), input/output interfaces, operating systems, applications, and other software or hardware components (not shown in the figures).

The BI tool module(s) 202 may be implemented as a combination of hardware and programming, for example, programmable instructions to implement a variety of functionalities of the BI tool module(s) 202. In examples described herein, such combinations of hardware and programming may be implemented in several different ways. For example, the programming for the BI tool module(s) 202 may be executable instructions. Such instructions may be stored on a non-transitory machine-readable storage medium which may be coupled either directly with the BI tool server 104 or indirectly (for example, through networked means). In an example, the BI tool module(s) 202 may include a processing resource, for example, either a single processor or a combination of multiple processors, to execute such instructions. In the present examples, the non-transitory machine-readable storage medium may store instructions that, when executed by the processing resource, implement BI tool module(s) 202. In other examples, the BI tool module(s) 202 may be implemented as electronic circuitry.

In one example, the BI tool module(s) 202 may include a BI tool communication module 206 and other BI tool module(s) 208. The other BI tool module(s) 208 may further implement functionalities that supplement functions performed by the BI tool server 104 or any of the BI tool module(s) 202. The BI tool communication module 206 may be a wireless communication module. Examples of the BI tool communication module 206 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the BI tool communication module 206 may also include one or more antennas to enable wireless transmission and reception of data and signals.

The BI tool data 204 includes data that is either received, stored, or generated as a result of functions implemented by any of the BI tool module(s) 202 or the BI tool server 104. It may be further noted that information stored and available in the BI tool data 204 may be utilized by the BI tool module(s) 202 for performing various functions by the BI tool server 104. The BI tool data 204 may include topic data 210 and other BI tool data 212. The topic data 210 may include data related to various topics customized by users of various organizations. Each of the various topics may represent a subject area such as sales, media, or marketing about which questions can be asked by a user of an organization. The other BI tool data 212 includes data that is either received, stored, or generated as a result of functions implemented by any of the BI tool module(s) 202 or the BI tool server 104.

In one example, the feedback application server 106 may include server module(s) 214 and server data 216. The feedback application server 106 may include components, other than the depicted components, such as display, processor(s), input/output interfaces, operating systems, applications, and other software or hardware components (not shown in the figures).

The server module(s) 214 may be implemented as a combination of hardware and programming, for example, programmable instructions to implement a variety of functionalities of the server module(s) 214. In examples described herein, such combinations of hardware and programming may be implemented in several different ways. For example, the programming for the server module(s) 214 may be executable instructions. Such instructions may be stored on a non-transitory machine-readable storage medium which may be coupled either directly with the feedback application server 106 or indirectly (for example, through networked means). In an example, the server module(s) 214 may include a processing resource, for example, either a single processor or a combination of multiple processors, to execute such instructions. In the present examples, the non-transitory machine-readable storage medium may store instructions that, when executed by the processing resource, implement server module(s) 214. In other examples, the server module(s) 214 may be implemented as electronic circuitry.

In one example, the server module(s) 214 may include a server communication module 218 and other server module(s) 220. The other server module(s) 220 may further implement functionalities that supplement functions performed by the feedback application server 106 or any of the server module(s) 214. The server communication module 218 may be a wireless communication module. Examples of the server communication module 218 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the server communication module 218 may also include one or more antennas to enable wireless transmission and reception of data and signals.

The server data 216 includes data that is either received, stored, or generated as a result of functions implemented by any of the server module(s) 214 or the feedback application server 106. It may be further noted that information stored and available in the server data 216 may be utilized by the server module(s) 214 for performing various functions by the feedback application server 106. The server data 216 may include feedback data 222 and other server data 224. The feedback data 222 may include data related to feedback received from users of various organizations that access feedback applications hosted by the feedback application server 106. For example, the feedback data 222 may include various synonyms provided for various data fields provided as the feedback by the users. The other server data 224 includes data that is either received, stored, or generated as a result of functions implemented by any of the server module(s) 214 or the feedback application server 106.

In one example, the system 102 may include processor(s) 228, interface(s) 230, memory 232, a system communication module 234, the system module(s) 110, and the system data 112. The system 102 may include components, other than the depicted components, such as display, input/output interfaces, operating systems, applications, and other software or hardware components (not shown in the figures).

The processor(s) 228 may be implemented as microprocessors, microcomputers, microcontrollers, digital signal processors, central processing units, state machines, logic circuitries, and/or other devices that manipulate signals based on operational instructions. The interface(s) 230 may allow the connection or coupling of the system 102 with one or more other devices, such as the BI tool server 104 and the feedback application server 106, through a wired (e.g., Local Area Network, i.e., LAN) connection or through a wireless connection (e.g., Bluetooth®, Wi-Fi). The interface(s) 230 may also enable intercommunication between different logical as well as hardware components of the system 102.

The memory 232 may be a computer-readable medium, examples of which include volatile memory (e.g., RAM), and/or non-volatile memory (e.g., Erasable Programmable read-only memory, i.e., EPROM, flash memory, etc.). The memory 232 may be an external memory, or internal memory, such as a flash drive, a compact disk drive, an external hard disk drive, or the like. The memory 232 may further include system data 112 and/or other system data which either may be received, utilized, or generated during the operation of the system 102.

The system communication module 234 may be a wireless communication module. Examples of the system communication module 234 may include, but are not limited to, Global System for Mobile communication (GSM) modules, Code-division multiple access (CDMA) modules, Bluetooth modules, network interface cards (NIC), Wi-Fi modules, dial-up modules, Integrated Services Digital Network (ISDN) modules, Digital Subscriber Line (DSL) modules, and cable modules. In one example, the system communication module 234 may also include one or more antennas to enable wireless transmission and reception of data and signals. The system communication module 234 may allow the system 102 to transmit data and signals to one or more other devices, such as the BI tool server 104 and the feedback application server 106, and receive data and signals from the one or more other devices.

In one example, the system module(s) 110 may include the synonym reconciliation module 114, the query processing module 116, and the other system module(s) 118, as explained with reference to FIG. 1. Further, the system data 112 may include the organization data 120 and the other system data 122, as explained with reference to FIG. 1.

As previously mentioned, one or more users that intend to seek details for various business-related aspects related to an organization may use the system 102 to provide feedback for the processing of natural language queries. In one example, a user, say, a first user of an organization may initially access a BI tool installed in the system 102 to customize and create various topics about which questions can be asked by users of the organization. Subsequently other users, such as a second user may access a feedback application installed in the system 102 to provide feedback for the processing of the natural language queries. The first user may then access the BI tool to optimize the various topics based on the feedback from the other users. The other users may then access the BI tool to raise the natural language queries and receive a response to the natural language queries based on the optimized topics.

In operation, to create the topics, the first user may access the system 102 to log-in into the BI tool installed in the system 102. The system 102 may, thus receive a BI tool log-in request from the first user for logging into the BI tool installed in the system 102. The BI tool log-in request may include BI tool log-in credentials, such as a user ID and a password, entered by the first user. The system 102 may query the BI tool server 104 about the BI tool log-in credentials to check if the first user is authorized to access the BI tool. Upon successful authentication of the first user, the system 102 may allow the first user to use the BI tool for configuring and customizing various topics. In an example, the first user may be associated with an organization. The first user may be referred to as a BI tool author. The BI tool author may be a user having authorization to configure and customize the topics to enable processing of natural language queries. The first user may configure and customize the topics for future use by the organization. Each topic of the various topics may represent a particular subject area such as sales, media, or marketing about which questions can be asked by users of the organization.

During creation of a particular topic through the BI tool, the system 102 may associate the particular topic with at least one dataset from amongst one or more datasets associated with the organization. The particular topic may be associated with the at least one dataset based on an input received from the BI tool author. For the sake of brevity, the one or more datasets may hereinafter be collectively referred to as the datasets and individually as dataset. In an example, the datasets may be stored in the system 102, for example, the memory 232 of the system 102. The datasets may be a part of the organization data 120. The dataset may include data in relation to the particular subject area represented by the particular topic. The dataset may include data fields, where each data field represents a subset of the data within the dataset. In an example, the data field may be a column name within the dataset. For instance, for a topic "product sales analysis", examples of the data fields may include "sales person", "product name", "date of sale", etc.

Further, during creation of the particular topic through the BI tool, the system 102 may assign synonyms to each data field, based on an input from the BI tool author, for enabling processing of natural language queries. For example, the BI tool author may assign synonyms "salesman", "saleswoman", "agent", "sales representative", etc., to the data field "sales person". Thus, even if the synonyms are used in a natural language query instead of the actual data field, the BI tool may be able to process the natural language query and provide a response for the natural language query. In this way, each data field under the particular topic may be associated with a list of pre-assigned synonyms created by the BI tool author.

The BI tool author may use the system 102 to create and customize various visual indicators. For the sake of brevity, the one or more visual indicators may hereinafter be collectively referred to as the visual indicators and individually as visual indicator. Examples of the visual indicator may include, but are not limited to, a chart, a graph, a dashboard, etc. In one example, the dashboard may further include one or more charts or graphs. The visual indicator may be created and customized to graphically represent the data within the datasets using the data fields. The data fields may, for example, be a parameter on an x-axis field of the visual indicator, a parameter on a y-axis field of the visual indicator, etc.

During creation of the particular topic through the BI tool, the BI tool author may use the system 102 to associate at least one visual indicator, from amongst the visual indicators, to the particular topic. The at least one visual indicator may then be used by the BI tool to respond to natural language queries about the particular topic raised by the users of the organization. In this way, the visual indicators may be pre-configured by the BI tool author for responding to the natural language queries raised by the users. Information about each topic may be stored in the BI tool server 104. Such information may be the topic data 210. The information may include information about particular datasets associated with the topic, particular visual indicators associated with the topic, particular data fields within the particular datasets, and particular data fields associated with the particular visual indicators.

Once the topics are created, users of the organization may access the system 102 to provide feedback regarding synonyms for the data field for further optimization of the topics. In an example, the system 102 may receive a feedback application log-in request from a user, say, the second user for logging into the feedback application installed in the system 102. The feedback application log-in request may include feedback application log-in credentials, such as a user ID and a password, entered by the second user. The system 102 may query the feedback application server 106 about the feedback application log-in credentials to check if the second user is authorized to access the feedback application. Upon successful authentication of the second user, the system 102 may allow the second user to use the feedback application for providing the feedback. The second user may be referred to as a BI tool reader. In an example, the BI tool reader may not have authorization to directly create or customize the topics using the BI tool. In an example, the first user and the second user may be associated with same organization.

Although, for brevity, only a single system 102, has been illustrated for accessing both the BI tool and the feedback application, it would be understood by a person skilled in the art that the BI tool and the feedback application may also be accessed separately through separate systems by same or different users. Further, although the BI tool and the feedback application have been explained to be logged in separately by the users, in an example, the BI tool may be embedded within the feedback application and a user may use a single sign-on (SSO) to access the feedback application having the BI tool embedded therein. In case of SSO, different users may be authorized to access different options within the feedback application and the BI tool. For example, one user may only be allowed to provide feedback for the topics and raise natural language queries in relation to the topics, while another user may be allowed to create or customize the topics and also raise natural language queries.

In an example, upon successful authentication, the synonym reconciliation module 114 of the system 102 may display a default user interface of the feedback application. The default user interface may include a feedback icon which may be selected by the second user to initiate a user request for enabling the second user to suggest and assign synonyms to a data field.

Upon selection of the feedback icon, the synonym reconciliation module 114 may detect the user request from the second user of the organization. In response to the user request, the synonym reconciliation module 114 may render a visual indicator and a customization tag associated with the visual indicator on a user interface. It should be understood that multiple visual indicators with their corresponding customization tags may also be rendered on the user interface. In an example, the synonym reconciliation module 114 may render all visual indicators which are allocated to the second user along with their corresponding customization tags. In other words, the synonym reconciliation module 114 may render all visual indicators, for which the second user has an access permission, along with their corresponding customization tags.

The synonym reconciliation module 114 may then ascertain if a user selection of the customization tag has been detected. In an example, the detection of the user selection may be considered as receiving a customization request in relation to the visual indicator. The customization request may be initiated by the second user when the second user wishes to suggest and assign synonyms to any data field associated with the visual indicator.

In response to detecting a user selection of the customization tag, the synonym reconciliation module 114 may obtain one or more data fields associated with the visual indicator on the user interface. The one or more data fields may be specific data fields, from amongst all the data fields associated with the visual indicator, for which the user is allowed to suggest and assign synonyms.

To obtain the one or more data fields, the synonym reconciliation module 114 may initially identify a first set of data fields in relation to the visual indicator. The first set of data fields may include all data fields that are particularly representable through the visual indicator for which the customization tag is selected by the user. In an example, the synonym reconciliation module 114 of the system 102 may communicate with the BI tool server 104 to obtain information about the visual indicator and identify the first set of data fields.

The synonym reconciliation module 114 may then identify one or more datasets from amongst a plurality of datasets associated with the organization. The one or more datasets may be datasets in relation to which the user is assigned a dataset access permission.

Subsequently, the synonym reconciliation module 114 may identify a second set of data fields associated with the one or more datasets from amongst the first set of data fields. Thus, the second set of data fields may be a subset of the first set of data fields that are associated with datasets which are allowed to be accessed by the user considering the dataset access permission.

Subsequently, the synonym reconciliation module 114 may identify one or more topics from amongst a plurality of topics associated with the organization. The one or more topics may be topics in relation to which the user is authorized to raise a natural language query. In an example, the synonym reconciliation module 114 of the system 102 may communicate with the BI tool server 104 to obtain information about the plurality of topics and identify the one or more topics.

Subsequently, the synonym reconciliation module 114 may identify the one or more data fields associated with the one or more topics from amongst the second set of data fields. Thus, the one or more data fields may be a subset of the second set of data fields that are associated with the topics about which the user is allowed to raise the natural language query.

The synonym reconciliation module 114 may then display the one or more data fields on the user interface. The one or more data fields that are identified may be displayed to the second user, enabling the second user to suggest synonyms for the one or more data fields. The second user may then use the system 102 to provide a first input. The first input may include one or more additional synonyms to be assigned to at least one data field from the one or more data fields that are displayed to the user. The synonym reconciliation module 114 may receive the first input from the second user.

In an example, upon receiving the first input, the synonym reconciliation module 114 may store the one or more additional synonyms for the at least one data field in a first database. The first database may be managed by a first entity. For example, the first entity may be a first organization that manages the feedback application. In this way, the BI tool reader may be able to provide feedback with regard to the synonyms for the data fields.

In an example, for utilizing the feedback provided by the second user and optimizing the topics, an other user, such as the BI tool author, may access the system 102 to initiate a reconciliation request. The reconciliation request may be a request to initiate a process of updating the synonyms for the data fields based on the feedback received from various users of the organization. In an example, the BI tool author may access the feedback application to initiate the reconciliation request. In an example, the BI tool may be embedded within the feedback application during initiation of the reconciliation request.

The synonym reconciliation module 114 may receive the reconciliation request from the other user. In response to the reconciliation request, the synonym reconciliation module 114 may retrieve the one or more additional synonyms for the at least one data field from the first database.

Further, the synonym reconciliation module 114 may retrieve a list of pre-assigned synonyms associated with the at least one data field from a second database. The second database may be managed by a second entity. The second entity may be different from the first entity. For example, the second entity may be a second organization that manages the BI tool application. The list of pre-assigned synonyms may be synonyms which are pre-configured by the BI tool author for the at least one data field prior to receiving the feedback from the BI tool reader. The list of pre-assigned synonyms may be used for processing of natural language queries in relation to one or more topics. The second user may be authorized to raise a natural language query in relation to the one or more topics, where the natural language query is to be processed using at least in part the at least one data field.

The synonym reconciliation module 114 may then reconcile the one or more additional synonyms with the list of pre-assigned synonyms to obtain an updated list of pre-assigned synonyms for the at least one data field. The updated list of pre-assigned synonyms may be used for future processing of natural language queries raised for the one or more topics.

For reconciling the list of pre-assigned synonyms with the one or more additional synonyms, the synonym reconciliation module 114 may identify at least one dataset from amongst the one or more datasets. For the sake of brevity, "at least one dataset" has been referred to as "dataset" hereinafter. The dataset may be a dataset in relation to which the other user is assigned a dataset access permission.

Further, the synonym reconciliation module 114 may identify at least one topic from amongst the one or more topics. For the sake of brevity, "at least one topic" has been referred to as "topic" hereinafter. The topic may be a topic in relation to which the other user is assigned a topic modification permission. In an example, the synonym reconciliation module 114 of the system 102 may communicate with the BI tool server 104 to obtain information about the one or more topics and identify the topic.

Then, the synonym reconciliation module 114 may identify a specific data field associated with the dataset and the topic from amongst the at least one data field. The specific data field may be a subset of the at least one data field for which the feedback is provided by the second user. The specific data field may be associated with datasets which are allowed to be accessed by the other user and associated with topics which are allowed to be modified by the other user.

For the specific data field, the synonym reconciliation module 114 may compare the one or more additional synonyms with the list of pre-assigned synonyms to determine at least one distinct synonym for the specific data field. Subsequently, the synonym reconciliation module 114 may incorporate the at least one distinct synonym in the list of pre-assigned synonyms to obtain the updated list of pre-assigned synonyms for the at least one data field. Thus, in view of the reconciliation request, feedback for only certain specific data fields is used considering the permissions of the other user.

Once the updated list of pre-assigned synonyms has been obtained, the synonym reconciliation module 114 may store the updated list of pre-assigned synonyms in the second database. In this way, the topics are optimized by the BI tool author utilizing the feedback of the BI tool reader.

In an example, when any user of the organization raises a natural language query using the BI tool installed on the system 102, the query processing module 116 of the system 102 may access the second database for processing of the natural language query for the one or more topics associated with the organization. In an example, the query processing module 116 may process the natural language query for the one or more topics using the updated list of pre-assigned synonyms. In this way, the BI tool application may be accessed by any user of the organization to raise natural language queries and seek details for various business-related aspects related to the organization. The query processing module 116 may provide a response to the natural language query in the form of visual indicators based on the processing of the natural language query using the updated list of pre-assigned synonyms.

Figure 3A:
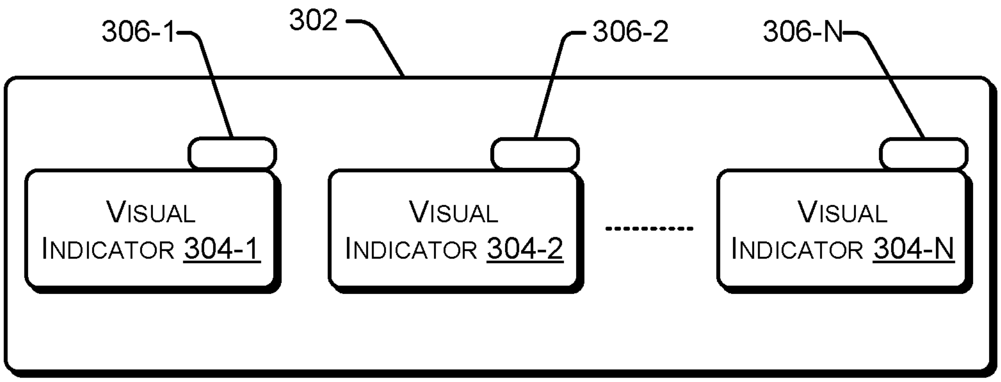
FIG. 3A and FIG. 3B illustrate schematic representations of user interfaces at different stages of receiving feedback from a user using the system, according to an example.
Figure 3B:
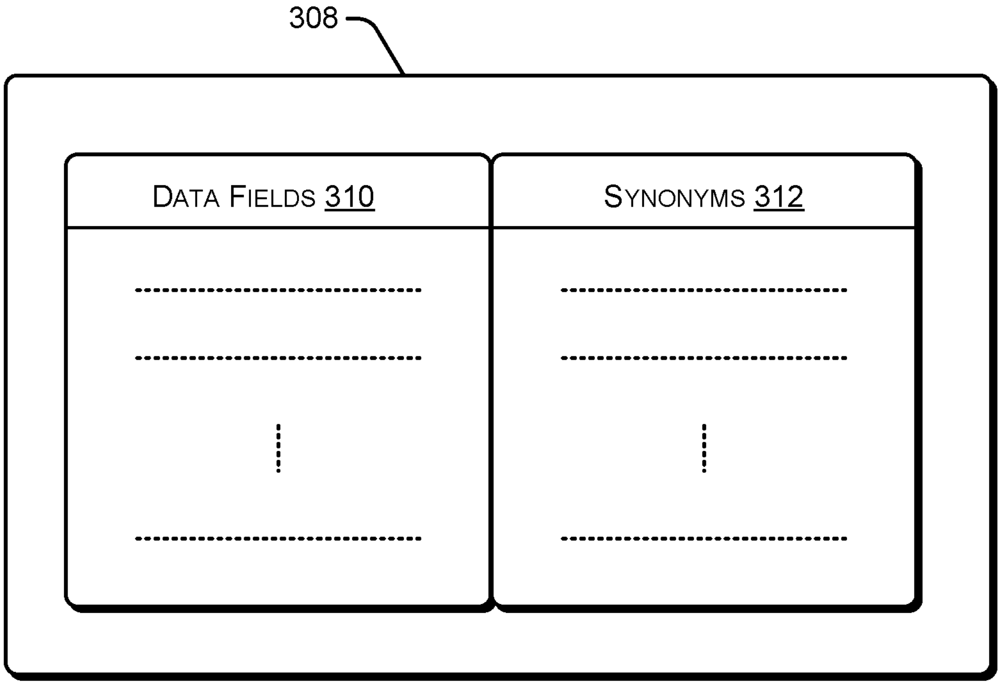

FIG. 3A and FIG. 3B illustrate schematic representations of user interfaces 302, 308 at different stages of receiving feedback from a user using a feedback application installed on the system 102, according to an example.

FIG. 3A illustrates a schematic representation of a user interface 302, according to an example. In an example, the user interface 302 may be presented to a user of an organization in response to a user request received from the user. The user request may be provided to initiate a feedback procedure for enabling the user to suggest and assign synonyms to one or more data fields. In an example, the user request may include launching of the feedback application by the user. In another example, the user request may include selection of a feedback icon dedicated within the feedback application for initiating the feedback procedure.

The user interface 302 may include one or more visual indicators 304-1, 304-2, . . . 304-N and one or more customization tags 306-1, 306-2, . . . 306-N. Here, N may be greater than or equal to 1. The one or more visual indicators 304-1, 304-2, . . . 304-N may be collectively referred to as visual indicators 304 and individually as visual indicator 304. The one or more customization tags 306-1, 306-2, . . . 306-N may be collectively referred to as customization tags 306 and individually as customization tag 306. The user interface 302 may also include components or icons other than the depicted components.

The visual indicators 304 may be particular visual indicators which are allocated to the user. Each corresponding visual indicator 304 may be associated with a corresponding customization tag 306. Selection of the corresponding customization tag 306 may initiate a customization request enabling the user to suggest and assign synonyms to any data field associated with the corresponding visual indicator 304.

FIG. 3B illustrates a schematic representation of a user interface 308 when the user selects the customization tag 306 of FIG. 3A. The user interface 308 includes a list of one or more data fields 310 and a list of synonyms 312. The user interface 308 may also include components or icons other than the depicted components.

In response to detecting a user selection of the customization tag 306, the one or more data fields 310 may be displayed on the user interface 308. The one or more data fields 310 may be associated with the visual indicator 304 for which the customization tag 306 is selected by the user. In an example, the one or more data fields 310 may be specific data fields, from amongst various data fields associated with the visual indicator 304, for which the user is allowed to suggest and assign the synonyms 312. In this way, the user may assign the synonyms 312 for any of the one or more data fields 310 displayed to the user. FIG. 3B illustrates that the one or more data fields 310 and the synonyms 312 have been displayed to the user in a tabular form. However, it should be understood that the data fields 310 and the synonyms 312 may be displayed in any other form, for example, in a list form, etc.

Figure 4A:
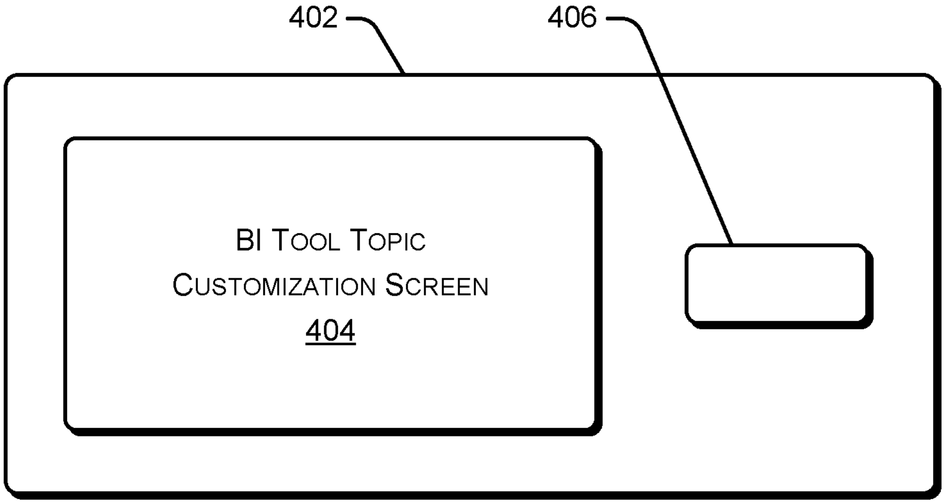
FIG. 4A and FIG. 4B illustrate schematic representations of user interfaces at different stages of utilizing feedback received from a user using the system, according to an example.
Figure 4B:
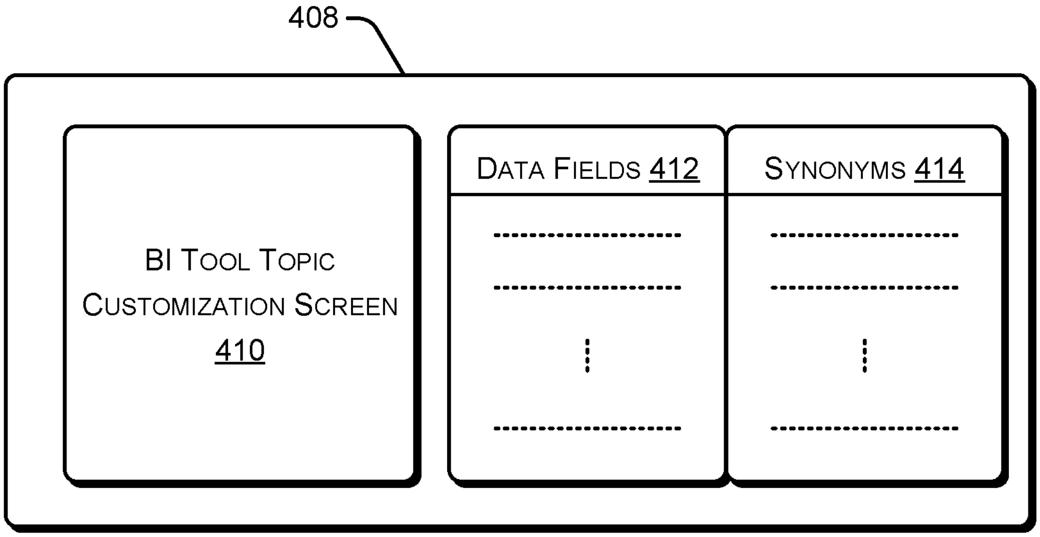
Figure 6A:
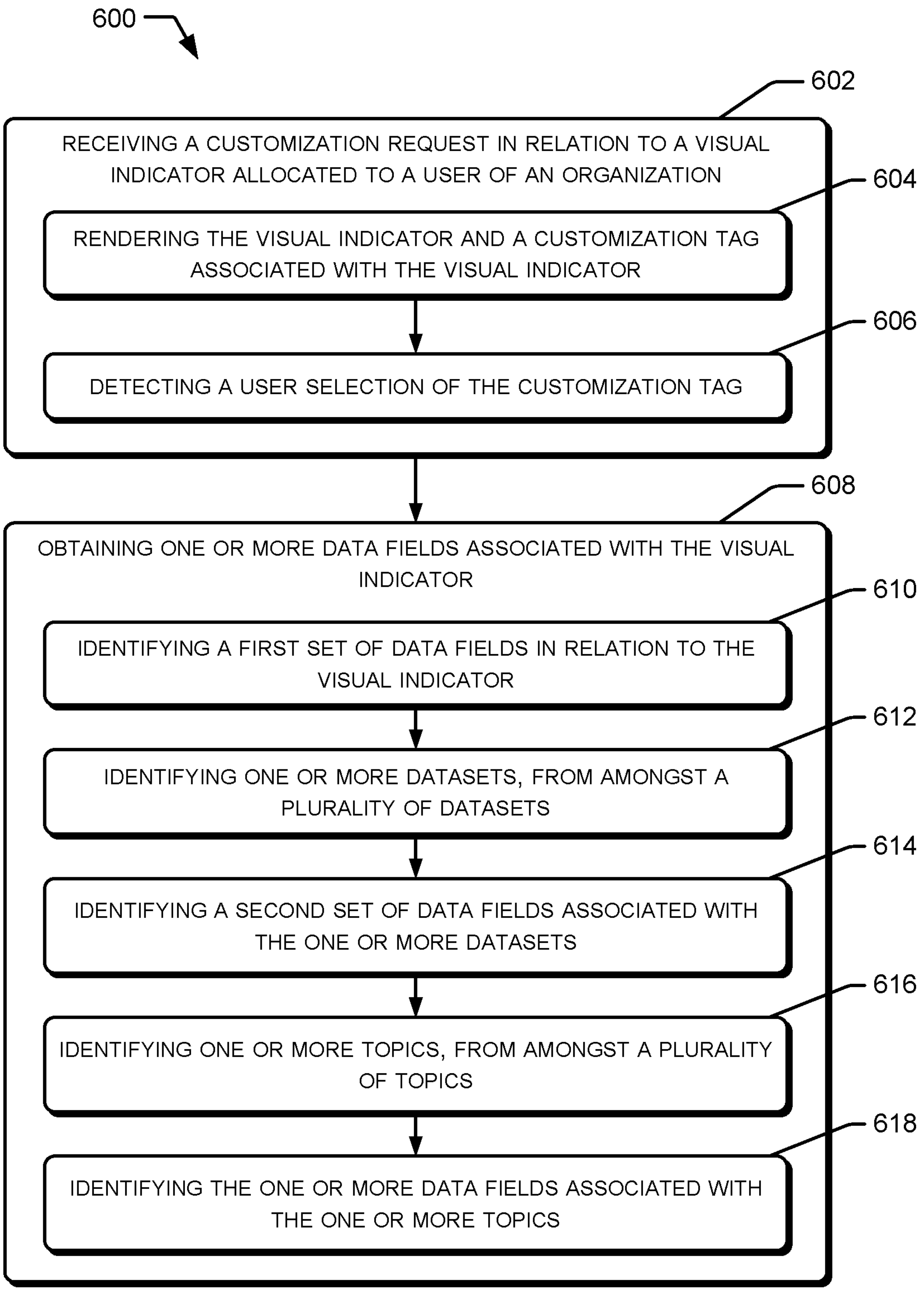
FIG. 6A to FIG. 6D illustrates a method for implementation of feedback techniques for processing of natural language queries, according to another example.
Figure 6B:
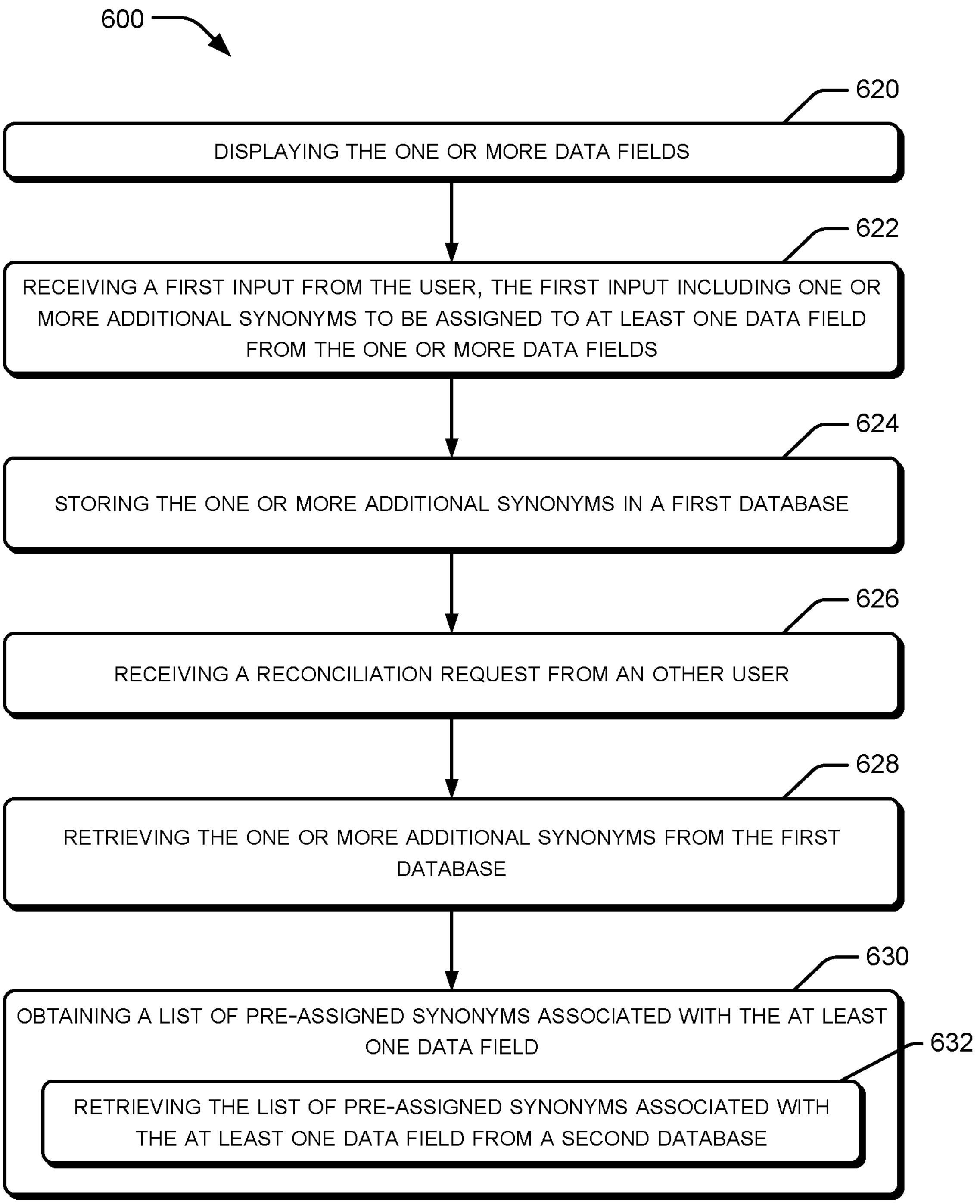
Figure 6C:
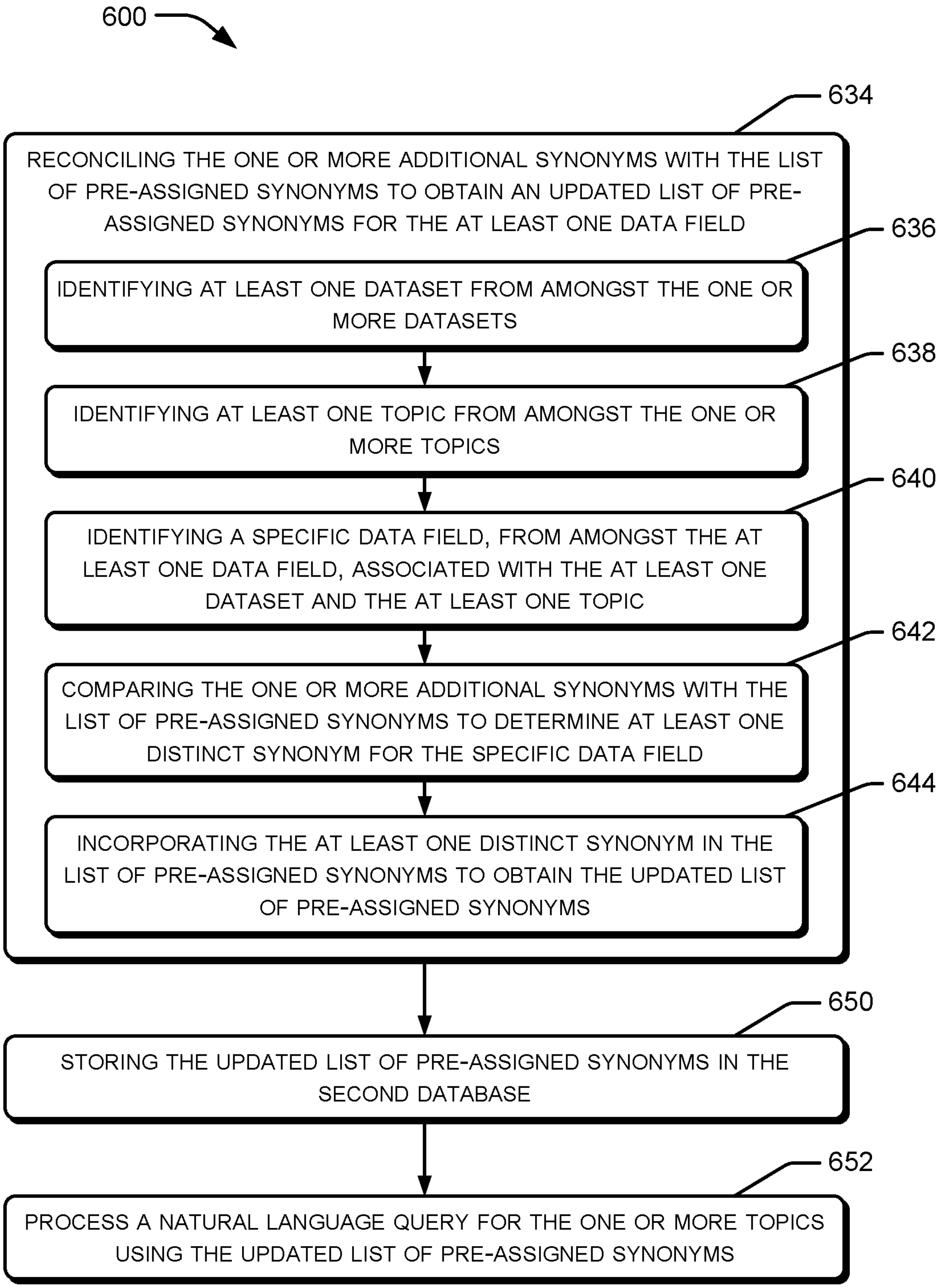
Figure 6D:
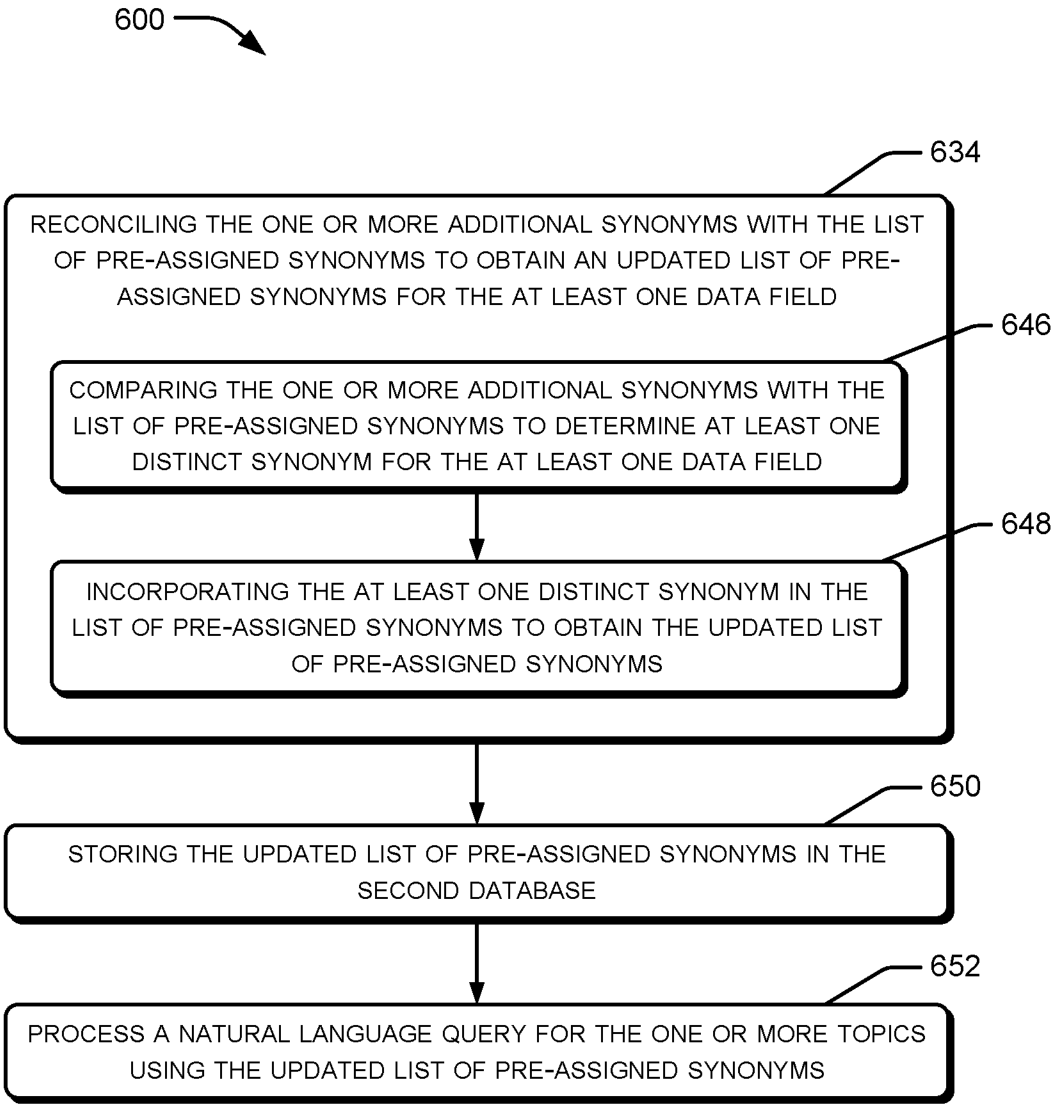

FIG. 4A and FIG. 4B illustrate schematic representations of user interfaces 402, 408 at different stages of utilizing feedback received from a user using the system 102, according to an example. The user interfaces 402, 408 have been illustrated for a scenario in which a BI tool is embedded within a feedback application.

FIG. 4A illustrates a schematic representation of a user interface 402, according to an example. The user interface 402 includes a BI tool topic customization screen 404 and a reconciliation icon 406. The user interface 402 may also include components or icons other than the depicted components.

The BI tool topic customization screen 404 may allow a user of an organization to create and customize various topics. For example, the user may assign synonyms to any data field used for processing of natural language queries for the various topics. Thus, the user may create a list of pre-assigned synonyms for any data field associated with the various topics. In an example, the BI tool topic customization screen 404 may be embedded within the feedback application providing the reconciliation icon 406, as shown in FIG. 4A.

The reconciliation icon 406 may be an icon which is selectable by the user to utilize one or more additional synonyms provided as feedback by various other users of the organization. In an example, selection of the reconciliation icon 406 may initiate a reconciliation request to automatically reconcile the one or more additional synonyms with the list of pre-assigned synonyms to obtain an updated list of pre-assigned synonyms for the data field using the system 102, as explained with reference to FIG. 1 and FIG. 2. In another example, as illustrated in FIG. 4B, selection of the reconciliation icon 406 may initiate a reconciliation request to present the feedback of the other users to the user for utilizing the feedback using the system 102.

FIG. 4B illustrates a schematic representation of a user interface 408, according to an example. In an example, the user interface 408 may be displayed to the user when the user selects the reconciliation icon 406. The user interface 408 includes a BI tool topic customization screen 410, one or more data fields 412, and synonyms 414 for the one or more data fields 412. The BI tool topic customization screen 410 may be same as the BI tool topic customization screen 404 of FIG. 4A. The synonyms 414 corresponding to the one or more data fields 412 may be the feedback received from the other users of the organization. In an example, the synonyms 414 corresponding to the one or more data fields 412 may be a part of the feedback received from the other users. The part of the feedback may be obtained and displayed in accordance with access permissions of the user utilizing the feedback.

FIG. 5 and FIG. 6A to FIG. 6D illustrate example methods 500 and 600, respectively, for implementation of feedback techniques for processing of natural language queries. The order in which the methods are described is not intended to be construed as a limitation, and any number of the described method blocks may be combined in any order to implement the methods, or an alternative method. Further, the methods 500 and 600 may be implemented by processing resource or computing device(s) through any suitable hardware, non-transitory machine-readable instructions, or combination thereof.

It may also be understood that methods 500 and 600 may be performed by programmed computing devices, such as the system 102, as depicted in FIG. 1 and FIG. 2. Furthermore, the methods 500 and 600 may be executed based on instructions stored in a non-transitory computer-readable medium, as will be readily understood. The non-transitory computer-readable medium may include, for example, digital memories, magnetic storage media, such as one or more magnetic disks and magnetic tapes, hard drives, or optically readable digital data storage media. While the methods 500 and 600 are described below with reference to the system 102 as described above; other suitable systems for the execution of these methods may also be utilized. Additionally, implementation of these methods is not limited to such examples.

FIG. 5 illustrates the method 500 for implementation of feedback techniques for processing of natural language queries, according to an example.

At block 502, a customization request may be received in relation to a visual indicator allocated to a user of an organization. The customization request may be initiated by the user when the user wishes to suggest and assign synonyms to any data field associated with the visual indicator.

At block 504, one or more data fields associated with the visual indicator may be obtained. Each of the one or more data fields may represent a subset, from one or more subsets, of data stored within one or more datasets associated with the user. The data may be graphically representable through the visual indicator. The data within the one or more datasets may be related to various subject areas such as sales, media, marketing, etc., about which questions can be asked by the user.

At block 506, the one or more data fields may be displayed on a user interface.

At block 508, a first input may be received from the user. The first input may include one or more additional synonyms to be assigned to at least one data field from the one or more data fields.

At block 510, a list of pre-assigned synonyms may be obtained. The list of pre-assigned synonyms may be associated with the at least one data field for processing of natural language queries in relation to one or more topics. The list of pre-assigned synonyms may be pre-configured for the at least one data field by another user of the organization. The one or more topics may be a subset of various topics customized for the organization. The user may be authorized to raise a natural language query in relation to the one or more topics, where the natural language query is to be processed using at least in part the at least one data field.

At block 512, the one or more additional synonyms may be reconciled with the list of pre-assigned synonyms to obtain an updated list of pre-assigned synonyms for the at least one data field. The updated list of pre-assigned synonyms may be used for future processing of natural language queries raised for the one or more topics. In this way, using feedback of the user about synonyms of the data fields, industry or enterprise specific terminologies may be incorporated in the list of synonyms that is used to process the natural language queries.

FIG. 6A to FIG. 6D illustrate the method 600 for implementation of feedback techniques for processing of natural language queries, according to an example.

At block 602, a customization request may be received in relation to a visual indicator allocated to a user of an organization. The customization request may be initiated by the user when the user wishes to suggest and assign synonyms to any data field associated with the visual indicator.

In an example, to receive the customization request, at block 604, the visual indicator and a customization tag associated with the visual indicator may be rendered on a user interface. In an example, the visual indicator and the customization tag may be rendered in response to a user request received from the user. In an example, the customization tag may be an icon that may be displayed on a display of the system 102 of FIG. 1 and FIG. 2. The customization tag may be selected by the user to initiate the customization request in relation to the visual indicator. In an example, the visual indicator may be configured as a selectable icon to act as the customization tag. In an example, the customization tag may be a dedicated icon separate from the visual indicator.

In an example, to receive the customization request, at block 606, a user selection of the customization tag may be detected. The detection of the user selection may be considered as receiving the customization request in relation to the visual indicator.

At block 608, one or more data fields associated with the visual indicator may be obtained. Each of the one or more data fields may represent a subset, from one or more subsets, of data stored within one or more datasets associated with the user. The data may be graphically representable through the visual indicator. The data within the one or more datasets may be related to various subject areas such as sales, media, marketing, etc., about which questions can be asked by the user. In an example, the one or more data fields may be specific data fields, from amongst all data fields associated with the visual indicator, for which the user is allowed to suggest and assign synonyms.

In an example, to obtain the one or more data fields, at block 610, a first set of data fields may be identified in relation to the visual indicator. The first set of data fields may include all data fields that are particularly representable through the visual indicator for which the customization request has been received from the user.

Further, to obtain the one or more data fields, at block 612, the one or more datasets may be identified from amongst a plurality of datasets associated with the organization. The one or more datasets may be datasets in relation to which the user is assigned a dataset access permission.

Subsequently, at block 614, a second set of data fields associated with the one or more datasets may be identified from amongst the first set of data fields. Thus, the second set of data fields may be a subset of the first set of data fields that are associated with datasets which are allowed to be accessed by the user considering the dataset access permission.

Further, to obtain the one or more data fields, at block 616, the one or more topics may be identified from amongst a plurality of topics associated with the organization. The one or more topics may be topics in relation to which the user is authorized to raise a natural language query.

Subsequently at block 618, the one or more data fields associated with the one or more topics may be identified from amongst the second set of data fields. Thus, the one or more data fields may be a subset of the second set of data fields that are associated with the topics about which the user is allowed to raise the natural language query.

At block 620, the one or more data fields may be displayed on the user interface. The one or more data fields that are identified may be displayed to the user, enabling the user to suggest synonyms for the one or more data fields.

At block 622, a first input may be received from the user. The first input may include one or more additional synonyms to be assigned to at least one data field from the one or more data fields.

Subsequently, at block 624, the one or more additional synonyms for the at least one data field may be stored in a first database. The first database may be managed by a first entity. For example, the first entity may be a first organization that manages the feedback application explained with reference to FIG. 1 and FIG. 2. In this way, the user may be able to provide feedback with regard to the synonyms for the data fields.

In an example, for utilizing the feedback provided by the user, at block 626, a reconciliation request may be received from an other user. The reconciliation request may be a request to initiate a process of updating the synonyms for the data fields based on the feedback received from various users of the organization.

Subsequently, at block 628, the one or more additional synonyms for the at least one data field may be retrieved from the first database.

Further, at block 630, a list of pre-assigned synonyms may be obtained. The list of pre-assigned synonyms may be associated with the at least one data field for processing of natural language queries in relation to one or more topics. The list of pre-assigned synonyms may be pre-configured for the at least one data field by another user of the organization. The one or more topics may be a subset of various topics customized for the organization. The user may be authorized to raise a natural language query in relation to the one or more topics, where the natural language query is to be processed using at least in part the at least one data field.

In an example, to obtain the list of pre-assigned synonyms, at block 632, the list of pre-assigned synonyms associated with the at least one data field may be retrieved from a second database. The list of pre-assigned synonyms may be retrieved for reconciliation with the one or more additional synonyms to obtain an updated list of pre-assigned synonyms. The second database may be managed by a second entity. The second entity may be different from the first entity. For example, the second entity may be a second organization that manages the BI tool application explained with reference to FIG. 1 and FIG. 2.

Subsequently, at block 634, the one or more additional synonyms may be reconciled with the list of pre-assigned synonyms to obtain the updated list of pre-assigned synonyms for the at least one data field. The updated list of pre-assigned synonyms may be used for future processing of natural language queries raised for the one or more topics.

In an example, to reconcile the list of pre-assigned synonyms with the one or more additional synonyms, at block 636, at least one dataset may be identified from amongst the one or more datasets. For the sake of brevity, “at least one dataset” has been referred to as “dataset” hereinafter. The dataset may be a dataset in relation to which the other user is assigned a dataset access permission.

Further, to reconcile the list of pre-assigned synonyms with the one or more additional synonyms, at block 638, at least one topic may be identified from amongst the one or more topics. For the sake of brevity, “at least one topic” has been referred to as “topic” hereinafter. The topic may be a topic in relation to which the other user is assigned a topic modification permission.

Subsequently, at block 640, a specific data field associated with the dataset and the topic may be identified from amongst the at least one data field. Thus, the specific data field may be a subset of the at least one data field for which the feedback is provided by the user. The specific data field may be associated with datasets which are allowed to be accessed by the other user and associated with topics which are allowed to be modified by the other user.

To reconcile the list of pre-assigned synonyms with the one or more additional synonyms, at block 642, the one or more additional synonyms may be compared with the list of pre-assigned synonyms to determine at least one distinct synonym for the specific data field.

Subsequently, at block 644, the at least one distinct synonym may be incorporated in the list of pre-assigned synonyms to obtain the updated list of pre-assigned synonyms for the at least one data field. Thus, in view of the reconciliation request, feedback for only certain specific data fields from the at least one data field may be used considering the permissions of the other user.

In another example, to reconcile the list of pre-assigned synonyms with the one or more additional synonyms, feedback for each of the at least one data field may be utilized. Thus, at block 646, the one or more additional synonyms may be compared with the list of pre-assigned synonyms to determine at least one distinct synonym for the at least one data field.

Further, at block 648, the at least one distinct synonym may be incorporated in the list of pre-assigned synonyms to obtain the updated list of pre-assigned synonyms for the at least one data field.

Subsequently, at block 650, the updated list of pre-assigned synonyms may be stored in the second database. The second database may be accessed for the future processing of the natural language queries.

At block 652, a natural language query for the one or more topics may be processed using the updated list of pre-assigned synonyms.

Figure 7:
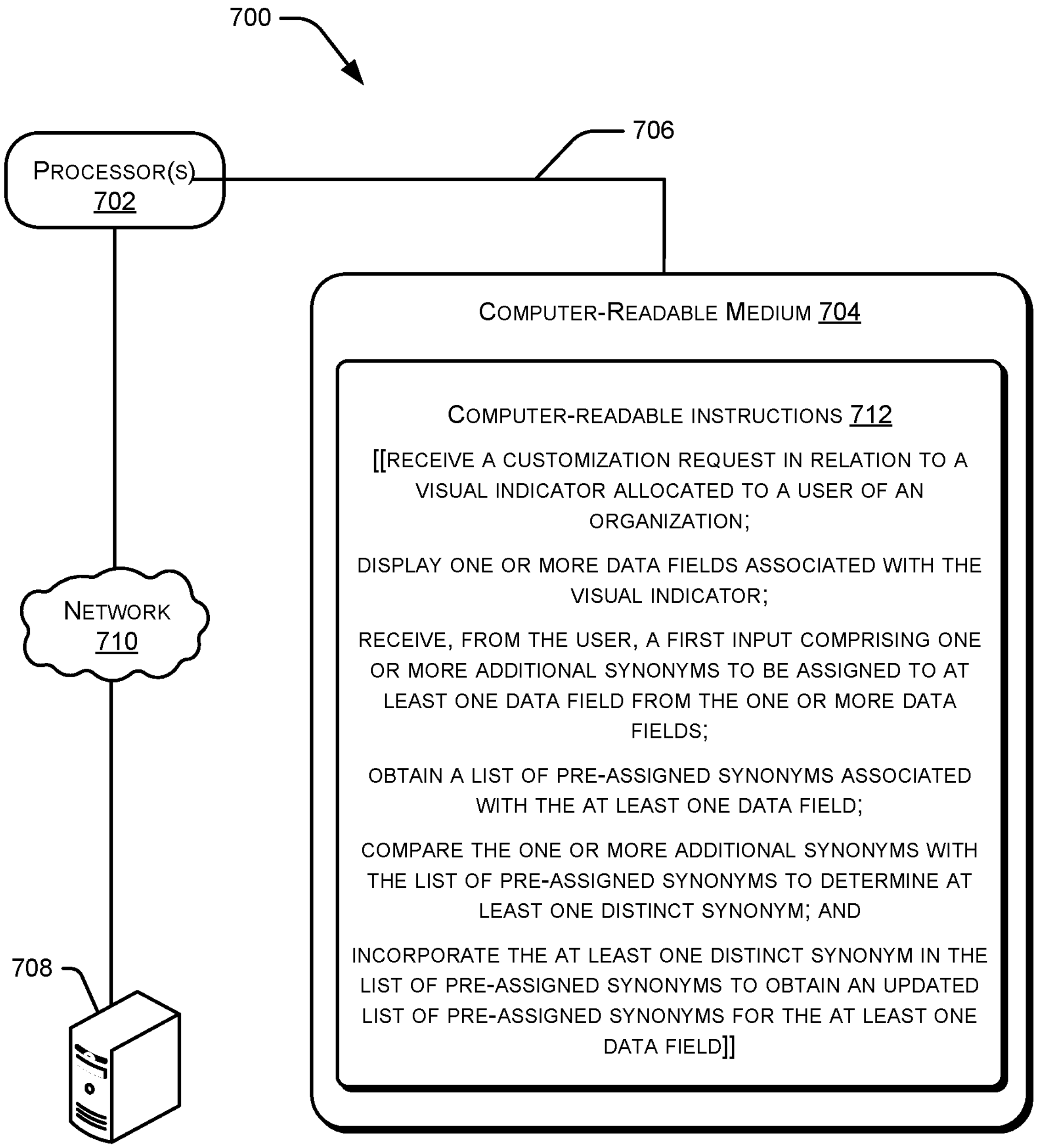
FIG. 7 illustrates a computing environment implementing a non-transitory computer-readable medium executing feedback techniques for processing of natural language queries, according to an example.

FIG. 7 illustrates a computing environment 700 implementing a non-transitory computer-readable medium for executing feedback techniques for processing of natural language queries, according to an example. In an example, the computing environment 700 includes processor(s) 702 communicatively coupled to a non-transitory computer-readable medium 704 through a communication link 706. In one example, the communication link 706 may be similar to the network 108, as described in conjunction with the preceding figures. In an example implementation, the computing environment 700 may be for example, the communication environment 100 or the communication environment 200. In an example, the processor(s) 702 may have one or more processing resources for fetching and executing computer-readable instructions from the non-transitory computer-readable medium 704. The processor(s) 702 and the non-transitory computer-readable medium 704 may be implemented, for example, in the system 102 (as has been described in conjunction with the preceding figures).

The non-transitory computer-readable medium 704 may be, for example, an internal memory device or an external memory device. In an example implementation, the communication link 706 may be a network communication link. The processor(s) 702 and the non-transitory computer-readable medium 704 may also be communicatively coupled to one or more servers 708 over a network 710. The one or more servers 708 may be the BI tool server 104 or the feedback application server 106 described in conjunction with FIG. 1 and FIG. 2. The network 710 may similar to the network 108 described in conjunction with FIG. 1 and FIG. 2.

In an example implementation, the non-transitory computer-readable medium 704 may include a set of computer-readable instructions 712 which may be accessed by the processor(s) 702 through the communication link 706. Referring to FIG. 7, in an example, the non-transitory computer-readable medium 704 may include instructions 712 that may cause the processor(s) 702 to receive a customization request in relation to a visual indicator allocated to a user of an organization. The customization request may be initiated by the user when the user wishes to suggest and assign synonyms to any data field associated with the visual indicator.

In an example, to receive the customization request, the instructions 712 may cause the processor(s) 702 to render the visual indicator and the customization tag associated with the visual indicator on a user interface. In an example, the visual indicator and the customization tag may be rendered in response to a user request received from the user. In an example, the customization tag may be an icon that may be displayed on a display of the system 102 of FIG. 1 and FIG. 2. The customization tag may be selected by the user to initiate the customization request in relation to the visual indicator. In an example, the visual indicator may be configured as a selectable icon to act as the customization tag. In an example, the customization tag may be a dedicated icon separate from the visual indicator.

Further, to receive the customization request, the instructions 712 may cause the processor(s) 702 to detect a user selection of the customization tag. The detection of the user selection may be considered as receiving the customization request in relation to the visual indicator.

The instructions 712 may further cause the processor(s) 702, in one example, to display, on the user interface, one or more data fields associated with the visual indicator. Each of the one or more data fields may represent a subset, from one or more subsets, of data stored within one or more datasets associated with the user. The data may be graphically representable through the visual indicator. The data within the one or more datasets may be related to various subject areas such as sales, media, marketing, etc., about which questions can be asked by the user. In an example, the one or more data fields may be specific data fields, from amongst all data fields associated with the visual indicator, for which the user is allowed to suggest and assign synonyms.

In an example, to display the one or more data fields associated with the visual indicator, the instructions 712 may cause the processor(s) 702 to identify a first set of data fields in relation to the visual indicator. The first set of data fields may include all data fields that are particularly representable through the visual indicator for which the customization request has been received from the user.

Further, to display the one or more data fields associated with the visual indicator, the instructions 712 may cause the processor(s) 702 to identify the one or more datasets from amongst a plurality of datasets associated with the organization. The one or more datasets may be datasets in relation to which the user is assigned a dataset access permission.

Subsequently, the instructions 712 may cause the processor(s) 702 to identify a second set of data fields, from amongst the first set of data fields, associated with the one or more datasets. Thus, the second set of data fields may be a subset of the first set of data fields that are associated with datasets which are allowed to be accessed by the user considering the dataset access permission.

Further, to display the one or more data fields associated with the visual indicator, the instructions 712 may cause the processor(s) 702 to identify the one or more topics from amongst a plurality of topics associated with the organization. The one or more topics may be topics in relation to which the user is authorized to raise a natural language query.

Subsequently, the instructions 712 may cause the processor(s) 702 to identify the one or more data fields, from amongst the second set of data fields, associated with the one or more topics. Thus, the one or more data fields may be a subset of the second set of data fields that are associated with the topics about which the user is allowed to raise the natural language query.

The instructions 712 may further cause the processor(s) 702, in one example, to receive a first input from the user. The first input may comprise one or more additional synonyms to be assigned to at least one data field from the one or more data fields.

Subsequently, the instructions 712 may further cause the processor(s) 702, in one example, to store the one or more additional synonyms for the at least one data field in a first database. The first database may be managed by a first entity. For example, the first entity may be a first organization that manages the feedback application explained with reference to FIG. 1 and FIG. 2. In this way, the user may be able to provide feedback with regard to the synonyms for the data fields.

In an example, for utilizing the feedback provided by the user, the instructions 712 may further cause the processor(s) 702 to receive a reconciliation request from an other user. The reconciliation request may be a request to initiate a process of updating the synonyms for the data fields based on the feedback received from various users of the organization.

Subsequently, the instructions 712 may cause the processor(s) 702, in one example, to retrieve the one or more additional synonyms from the first database.

Further, the instructions 712 may cause the processor(s) 702, in one example, to obtain a list of pre-assigned synonyms. The list of pre-assigned synonyms may be associated with the at least one data field for processing of natural language queries in relation to one or more topics. The list of pre-assigned synonyms may be pre-configured for the at least one data field by another user of the organization. The one or more topics may be a subset of various topics customized for the organization. The user may be authorized to raise a natural language query in relation to the one or more topics, where the natural language query is to be processed using at least in part the at least one data field.

In an example, to obtain the list of pre-assigned synonyms, the instructions 712 may further cause the processor(s) 702, in one example, to retrieve the list of pre-assigned synonyms associated with the at least one data field from a second database. The list of pre-assigned synonyms may be retrieved for comparing with the one or more additional synonyms. The second database may be managed by a second entity. The second entity may be different from the first entity. For example, the second entity may be a second organization that manages the BI tool application explained with reference to FIG. 1 and FIG. 2.

The instructions 712 may further cause the processor(s) 702, in one example, to compare the one or more additional synonyms with the list of pre-assigned synonyms to determine at least one distinct synonym.

The instructions 712 may further cause the processor(s) 702, in one example, to incorporate the at least one distinct synonym in the list of pre-assigned synonyms to obtain an updated list of pre-assigned synonyms for the at least one data field. The updated list of pre-assigned synonyms may be used for future processing of natural language queries raised for the one or more topics.

In an example, to determine the at least one distinct synonym, the instructions 712 may cause the processor(s) 702 to identify at least one dataset from amongst the one or more datasets. For the sake of brevity, "at least one dataset" has been referred to as "dataset" hereinafter. The dataset may be a dataset in relation to which the other user is assigned a dataset access permission.

Further, to determine the at least one distinct synonym, the instructions 712 may cause the processor(s) 702 to identify at least one topic from amongst the one or more topics. For the sake of brevity, "at least one topic" has been referred to as "topic" hereinafter. The topic may be a topic in relation to which the other user is assigned a topic modification permission.

Subsequently, to determine the at least one distinct synonym, the instructions 712 may cause the processor(s) 702 to identify a specific data field, from amongst the at least one data field, associated with the dataset and the topic. Thus, the specific data field may be a subset of the at least one data field for which the feedback is provided by the user. The specific data field may be associated with datasets which are allowed to be accessed by the other user and associated with topics which are allowed to be modified by the other user.

The instructions 712 may further cause the processor(s) 702 to determine the at least one distinct synonym for the specific data field based on a comparison of the one or more additional synonyms with the list of pre-assigned synonyms.

In an example, the instructions 712 may cause the processor(s) 702 to store the updated list of pre-assigned synonyms in the second database. The second database may be accessed for the future processing of the natural language queries raised for the one or more topics.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

I claim:

1. A method comprising:
   - receiving a customization request in relation to a visual indicator allocated to a user of an organization;
   - obtaining one or more data fields associated with the visual indicator, wherein each of the one or more data fields is to represent a subset, from one or more subsets, of data stored within one or more datasets associated with the user, wherein the data is graphically representable through the visual indicator;
   - displaying, on a user interface, the one or more data fields;
   - receiving a first input from the user, wherein the first input includes one or more additional synonyms to be assigned to at least one data field from the one or more data fields;
   - retrieving the one or more additional synonyms from a first database, wherein the first database stores user-provided synonyms;
   - obtaining a list of pre-assigned synonyms associated with the at least one data field from a second database for processing of natural language queries in relation to one or more topics, wherein the user is authorized to raise a natural language query in relation to the one or more topics, and wherein the natural language query is to be processed using at least in part the at least one data field;
   - reconciling the one or more additional synonyms with the list of pre-assigned synonyms to obtain an updated list of pre-assigned synonyms for the at least one data field; and
   - storing the updated list of pre-assigned synonyms in the second database in association with the at least one data field, wherein the updated list of pre-assigned synonyms in the second database is to be used for future processing of natural language queries raised for the one or more topics.

2. The method of claim 1, wherein receiving the customization request comprises:
   - rendering the visual indicator and a customization tag associated with the visual indicator on the user interface in response to a user request received from the user; and
   - detecting a user selection of the customization tag.

3. The method of claim 1, wherein obtaining the one or more data fields associated with the visual indicator comprises:
   - identifying a first set of data fields in relation to the visual indicator;
   - identifying the one or more datasets, from amongst a plurality of datasets associated with the organization, in relation to which the user is assigned a dataset access permission;
   - identifying a second set of data fields, from amongst the first set of data fields, associated with the one or more datasets;
   - identifying the one or more topics, from amongst a plurality of topics associated with the organization, in relation to which the user is authorized to raise a natural language query; and
   - identifying the one or more data fields, from amongst the second set of data fields, associated with the one or more topics.

4. The method of claim 1, wherein reconciling the one or more additional synonyms with the list of pre-assigned synonyms comprises:
   - comparing the one or more additional synonyms with the list of pre-assigned synonyms to determine at least one distinct synonym for the at least one data field; and
   - incorporating the at least one distinct synonym in the list of pre-assigned synonyms to obtain the updated list of pre-assigned synonyms for the at least one data field.

5. The method of claim 1, wherein the method comprises:
   - storing the one or more additional synonyms for the at least one data field in the first database, wherein the first database is managed by a first entity.

6. The method of claim 5, wherein the method comprises:
   - retrieving the list of pre-assigned synonyms associated with the at least one data field from the second database for reconciliation with the one or more additional synonyms to obtain the updated list of pre-assigned synonyms, wherein the second database is managed by a second entity, wherein the second entity is different from the first entity; and
   - processing the natural language query for the one or more topics using the updated list of pre-assigned synonyms to generate a response in the form of the visual indicator.

7. The method of claim 1, wherein reconciling the one or more additional synonyms with the list of pre-assigned synonyms comprises:
   - receiving a reconciliation request from an other user;
   - identifying at least one dataset, from amongst the one or more datasets, in relation to which the other user is assigned a dataset access permission;
   - identifying at least one topic, from amongst the one or more topics, in relation to which the other user is assigned a topic modification permission;
   - identifying a specific data field, from amongst the at least one data field, associated with the at least one dataset and the at least one topic;
   - comparing the one or more additional synonyms with the list of pre-assigned synonyms to determine at least one distinct synonym for the specific data field; and
   - incorporating the at least one distinct synonym in the list of pre-assigned synonyms to obtain the updated list of pre-assigned synonyms for the at least one data field.

8. A system comprising:
   - a processor;
   - a memory;
   - a synonym reconciliation module to:
     - render a visual indicator and a customization tag associated with the visual indicator on a user interface in response to a user request received from a user of an organization;
     - display, on the user interface, one or more data fields associated with the visual indicator in response to detecting a user selection of the customization tag, wherein each of the one or more data fields is to represent a subset, from one or more subsets, of data stored within a dataset associated with the user, wherein the data is graphically representable through the visual indicator;
     - receive, from the user, a first input comprising one or more additional synonyms to be assigned to at least one data field from the one or more data fields;

retrieve the one or more additional synonyms from a first database, wherein the first database stores user-provided synonyms;

obtain a list of pre-assigned synonyms associated with the at least one data field from a second database for processing of natural language queries in relation to one or more topics, wherein the user is authorized to raise a natural language query in relation to the one or more topics, and wherein the natural language query is to be processed using at least in part the at least one data field;

reconcile the one or more additional synonyms with the list of pre-assigned synonyms to obtain an updated list of pre-assigned synonyms for the at least one data field; and store the updated list of pre-assigned synonyms in the second database in association with the at least one data field, wherein the updated list of pre-assigned synonyms in the second database is to be used for future processing of natural language queries raised for the one or more topics; and a query processing module to:

process a natural language query for the one or more topics using the updated list of pre-assigned synonyms.

9. The system of claim 8, wherein to reconcile the one or more additional synonyms with the list of pre-assigned synonyms, the synonym reconciliation module is to:

compare the one or more additional synonyms with the list of pre-assigned synonyms to determine at least one distinct synonym for the at least one data field; and incorporate the at least one distinct synonym in the list of pre-assigned synonyms to obtain the updated list of pre-assigned synonyms.

10. The system of claim 8, wherein to display the one or more data fields associated with the visual indicator, the synonym reconciliation module is to:

identify a first set of data fields in relation to the visual indicator;

identify the dataset, from amongst a plurality of datasets associated with the organization, in relation to which the user is assigned a dataset access permission;

identify a second set of data fields, from amongst the first set of data fields, associated with the dataset;

identify the one or more topics, from amongst a plurality of topics associated with the organization, in relation to which the user is authorized to raise a natural language query; and identify the one or more data fields, from amongst the second set of data fields, associated with the one or more topics.

11. The system of claim 8, wherein the synonym reconciliation module is to:

store the one or more additional synonyms for the at least one data field in the first database, wherein the first database is managed by a first entity.

12. The system of claim 11, wherein the synonym reconciliation module is to:

retrieve the list of pre-assigned synonyms associated with the at least one data field from the second database for reconciliation with the one or more additional synonyms to obtain the updated list of pre-assigned synonyms, wherein the second database is managed by a second entity, wherein the second entity is different from the first entity.

13. The system of claim 12, wherein the query processing module is to access the second database for processing the natural language query for the one or more topics using the updated list of pre-assigned synonyms to generate a response in the form of the visual indicator.

14. The system of claim 8, wherein to reconcile the one or more additional synonyms with the list of pre-assigned synonyms, the synonym reconciliation module is to:

receive a reconciliation request from an other user;

identify that the other user is assigned a dataset access permission in relation to the dataset;

identify at least one topic, from amongst the one or more topics, in relation to which the other user is assigned a topic modification permission;

identify a specific data field, from amongst the at least one data field, associated with the dataset and the at least one topic;

compare the one or more additional synonyms with the list of pre-assigned synonyms to determine at least one distinct synonym for the specific data field; and incorporate the at least one distinct synonym in the list of pre-assigned synonyms to obtain the updated list of pre-assigned synonyms for the at least one data field.

15. A non-transitory computer-readable medium comprising instructions for executing feedback techniques for processing of natural language queries, the instructions being executable by a processing resource to:

receive a customization request in relation to a visual indicator allocated to a user of an organization;

display, on a user interface, one or more data fields associated with the visual indicator, wherein each of the one or more data fields is to represent a subset, from one or more subsets, of the data stored within one or more datasets associated with the user, wherein the data is graphically representable through the visual indicator;

receive, from the user, a first input comprising one or more additional synonyms to be assigned to at least one data field from the one or more data fields;

retrieve the one or more additional synonyms from a first database, wherein the first database stores user-provided synonyms;

obtain a list of pre-assigned synonyms associated with the at least one data field from a second database for processing of natural language queries in relation to one or more topics, wherein the user is authorized to raise a natural language query in relation to the one or more topics, and wherein the natural language query is to be processed using at least in part the at least one data field;

compare the one or more additional synonyms with the list of pre-assigned synonyms to determine at least one distinct synonym;

incorporate the at least one distinct synonym in the list of pre-assigned synonyms to obtain an updated list of pre-assigned synonyms for the at least one data field, wherein the updated list of pre-assigned synonyms is to be used for future processing of natural language queries raised for the one or more topics; and store the updated list of pre-assigned synonyms in the second database in association with the at least one data field, wherein the updated list of pre-assigned synonyms in the second database is to be used for future processing of natural language queries raised for the one or more topics.

16. The non-transitory computer-readable medium of claim 15, wherein to receive the customization request, the instructions are executable by the processing resource to:

render the visual indicator and a customization tag associated with the visual indicator on the user interface in response to a user request received from the user; and detect a user selection of the customization tag.

17. The non-transitory computer-readable medium of claim 15, wherein to display the one or more data fields associated with the visual indicator, the instructions are executable by the processing resource to:

identify a first set of data fields in relation to the visual indicator;

identify the one or more datasets, from amongst a plurality of datasets associated with the organization, in relation to which the user is assigned a dataset access permission;

identify a second set of data fields, from amongst the first set of data fields, associated with the one or more datasets;

identify the one or more topics, from amongst a plurality of topics associated with the organization, in relation to which the user is authorized to raise a natural language query; and identify the one or more data fields, from amongst the second set of data fields, associated with the one or more topics.

18. The non-transitory computer-readable medium of claim 15, wherein the instructions are executable by the processing resource to:

store the one or more additional synonyms for the at least one data field in the first database, wherein the first database is managed by a first entity.

19. The non-transitory computer-readable medium of claim 18, wherein the instructions are executable by the processing resource to:

retrieve the list of pre-assigned synonyms associated with the at least one data field from the second database for comparing with the one or more additional synonyms, wherein the second database is managed by a second entity, wherein the second entity is different from the first entity.

20. The non-transitory computer-readable medium of claim 15, wherein to determine the at least one distinct synonym, the instructions are executable by the processing resource to:

receive a reconciliation request from an other user;

identify at least one dataset, from amongst the one or more datasets, in relation to which the other user is assigned a dataset access permission;

identify at least one topic, from amongst the one or more topics, in relation to which the other user is assigned a topic modification permission;

identify a specific data field, from amongst the at least one data field, associated with the at least one dataset and the at least one topic; and determine the at least one distinct synonym for the specific data field based on a comparison of the one or more additional synonyms with the list of pre-assigned synonyms.

* * * * *